(12) United States Patent
Srinivasan et al.

(10) Patent No.: US 12,411,082 B2
(45) Date of Patent: Sep. 9, 2025

(54) METHODS AND SYSTEMS FOR SENSING A ROAD SURFACE

(71) Applicant: Ohio State Innovation Foundation, Columbus, OH (US)

(72) Inventors: Kannan Srinivasan, Columbus, OH (US); Wei Sun, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 219 days.

(21) Appl. No.: 18/208,494

(22) Filed: Jun. 12, 2023

(65) Prior Publication Data

US 2024/0053266 A1   Feb. 15, 2024

Related U.S. Application Data

(60) Provisional application No. 63/370,944, filed on Aug. 10, 2022.

(51) Int. Cl.
*G01N 21/47*  (2006.01)
*G01N 23/04*  (2018.01)

(52) U.S. Cl.
CPC ............ *G01N 21/47* (2013.01); *G01N 23/04* (2013.01); *G01N 2021/4709* (2013.01)

(58) Field of Classification Search
None
See application file for complete search history.

(56) References Cited

U.S. PATENT DOCUMENTS

| 2008/0069027 A1 * | 3/2008 | Kong | H04B 1/7107 |
| | | | 370/328 |
| 2020/0047581 A1 * | 2/2020 | Kokotovic | B60G 13/08 |

(Continued)

FOREIGN PATENT DOCUMENTS

| CA | 3155591 A1 * | 3/2021 | ............ B60W 10/20 |
| CN | 113671491 A * | 11/2021 | |
| DE | 102014214927 A1 * | 2/2016 | ........... G01S 13/003 |

(Continued)

OTHER PUBLICATIONS

Automatic road analyzer. https://www.wtae.com/article/aran-on-the-prowl-automatic-road-analyzer-gathers-information-to-mapfuture-state-road-repairs-1/7462861.

(Continued)

*Primary Examiner* — Fekadeselassie Girma
(74) *Attorney, Agent, or Firm* — Meunier Carlin & Curfman LLC

(57) ABSTRACT

An example system for remote sensing of a road surface includes an antenna configured to transmit and receive radiofrequency (RF) signals, where the antenna is configured to attach to a front end of a vehicle; at least one radiofrequency identification (RFID) tag, where the at least one RFID tag is configured to attach to the front end of a vehicle; and an RFID reader, wherein the RFID reader is configured to: cause the antenna to transmit a radiofrequency signal toward a road surface, where the at least one RFID tag receives a backscattered RF signal from the road surface; receive, from the antenna, an RFID signal from the first RFID tag, the RFID signal comprising phase and magnitude information; and analyze the phase and magnitude information to determine a condition of the road surface.

16 Claims, 31 Drawing Sheets

(56) References Cited

U.S. PATENT DOCUMENTS

2024/0053266 A1* 2/2024 Srinivasan ............. G01N 21/47
2025/0057633 A1* 2/2025 Hilse ...................... A61B 34/25

FOREIGN PATENT DOCUMENTS

DE          102018203924 A1 * 9/2019  ............. G01S 13/08
WO     WO-2022140477 A1 * 6/2022  ......... G01C 21/3822
WO     WO-2022140657 A1 * 6/2022  ............ B60W 10/22

OTHER PUBLICATIONS

Understanding the Link Between Unsafe Road Conditions and Car Accidents. https://www.makeroadssafe.org/understanding-the-linkbetween-unsafe-road-conditions-and-car-accidents/.
Omid Abari, Deepak Vasisht, Dina Katabi, and Anantha Chandrakasan. 2015. Caraoke: An e-toll transponder network for smart cities.In Proceedings of the 2015 ACM Conference on Special Interest Group on Data Communication. 297-310.
Alien. 2020. ALR-8697-8. https://www.alientechnology.com/products/antennas/alr-8697-8/.
Zhenlin An, Qiongzheng Lin, and Lei Yang. 2018. Cross-frequency communication: Near-field identification of uhf rfids with wifi!. InProceedings of the 24th Annual International Conference on Mobile Computing and Networking. 623-638.
AtlasRFIDstore. 2020. Commodity passive RFID tags. https://www.atlasrfidstore.com/rfid-tag-sample-pack-uhf-passive/.
AtlasRFIDstore. 2020. Commodity Passive RFID tags. https://www.atlasrfidstore.com/rfid-tags/.
Joshua F Ensworth and Matthew S Reynolds. 2015. Every smart phone is a backscatter reader: Modulated backscatter compatibility withbluetooth 4.0 low energy (ble) devices. In 2015 IEEE international conference on RFID (RFID). IEEE, 78-85.
Jakob Eriksson, Lewis Girod, Bret Hull, Ryan Newton, Samuel Madden, and Hari Balakrishnan. 2008. The pothole patrol: using a mobilesensor network for road surface monitoring. In Proceedings of the 6th international conference on Mobile systems, applications, and services. 29-39.
Junfeng Guan, Sohrab Madani, Suraj Jog, Saurabh Gupta, and Haitham Hassanieh. 2020. Through Fog High-Resolution Imaging Using Millimeter Wave Radar. In Proceedings of the IEEE/CVF Conference on Computer Vision and Pattern Recognition. 11464-11473.
Abhishek Gupta, Shaohan Hu,Weida Zhong, Adel Sadek, Lu Su, and Chunming Qiao. 2020. Road Grade Estimation Using Crowd-SourcedSmartphone Data. In 2020 19th ACM/IEEE International Conference on Information Processing in Sensor Networks (IPSN). IEEE, 313-324.
Unsoo Ha, Junshan Leng, Alaa Khaddaj, and Fadel Adib. 2020. Food and Liquid Sensing in Practical Environments using RFIDs. In 17th {USENIX} Symposium on Networked Systems Design and Implementation ({NSDI} 20). 1083-1100.
Jens Jauch, Johannes Masino, Tim Staiger, and Frank Gauterin. 2017. Road grade estimation with vehicle-based inertial measurement unit and orientation filter. IEEE Sensors Journal 18, 2 (2017), 781-789.
Haojian Jin, Zhijian Yang, Swarun Kumar, and Jason I Hong. 2018. Towards wearable everyday body-frame tracking using passive rfids. Proceedings of the ACM on Interactive, Mobile, Wearable and Ubiquitous Technologies 1, 4 (2018), 1-23.
Nikos Kargas, Fanis Mavromatis, and Aggelos Bletsas. 2015. Fully-coherent reader with commodity SDR for Gen2 FM0 and computational RFID. IEEE Wireless Communications Letters 4, 6 (2015), 617-620.
Keiko Katsuragawa, Ju Wang, Ziyang Shan, Ningshan Ouyang, Omid Abari, and Daniel Vogel. 2019. Tip-Tap: Battery-free Discrete 2D Fingertip Input. In Proceedings of the 32nd Annual ACM Symposium on User Interface Software and Technology. 1045-1057.
Rushil Khurana and Mayank Goel. 2020. Eyes on the Road: Detecting Phone Usage by Drivers Using On-Device Cameras. In Proceedings of the 2020 CHI Conference on Human Factors in Computing Systems. 1-11.
Martin Laurenzis, Frank Christnacher, Emmanuel Bacher, Nicolas Metzger, Stéphane Schertzer, and Thomas Scholz. 2011. Newapproaches of three-dimensional range-gated imaging in scattering environments. In Electro-Optical Remote Sensing, Photonic Technologies, and Applications V, vol. 8186. International Society for Optics and Photonics, 818603.
Jaeyoung Lee, BooHyun Nam, and Mohamed Abdel-Aty. 2015. Effects of pavement surface conditions on traffic crash severity. Journal of Transportation Engineering 141, 10 (2015), 04015020.
Yunfei Ma, Nicholas Selby, and Fadel Adib. 2017. Minding the billions: Ultra-wideband localization for deployed rfid tags. In Proceedings of the 23rd Annual International Conference on Mobile Computing and Networking. 248-260.
Prashanth Mohan, Venkata N Padmanabhan, and Ramachandran Ramjee. 2008. Nericell: rich monitoring of road and traffic conditions using mobile smartphones. In Proceedings of the 6th ACM conference on Embedded network sensor systems. 323-336.
Kun Qian, Shilin Zhu, Xinyu Zhang, and Li Erran Li. 2021. Robust Multimodal Vehicle Detection in FoggyWeather Using Complementary Lidar and Radar Signals. In Proceedings of the IEEE/CVF Conference on Computer Vision and Pattern Recognition. 444-453.
Ettus Research. 2020. USRP N210. https://www.ettus.com/product/details/UN210-KIT/.
Guy Satat, Matthew Tancik, and Ramesh Raskar. 2018. Towards photography through realistic fog. In 2018 IEEE International Conference on Computational Photography (ICCP). IEEE, 1-10.
Fatjon Seraj, Berend Jan van der Zwaag, Arta Dilo, Tamara Luarasi, and Paul Havinga. 2015. RoADS: A road pavement monitoring system for anomaly detection using smart phones. In Big data analytics in the social and ubiquitous context. Springer, 128-146.
Wei Sun and Kannan Srinivasan. [n. d.]. Allergie: Relative Vehicular Localization with Commodity RFID System. In 2020 IEEE International Conference on RFID (RFID). IEEE, 1-8.
Saurabh Tiwari, Ravi Bhandari, and Bhaskaran Raman. 2020. Roadcare: a deep-learning based approach to quantifying road surface quality. In Proceedings of the 3rd ACM SIGCAS Conference on Computing and Sustainable Societies. 231-242.
Jue Wang, Fadel Adib, Ross Knepper, Dina Katabi, and Daniela Rus. 2013. RF-compass: Robot object manipulation using RFIDs. In Proceedings of the 19th annual international conference on Mobile computing & networking. 3-14.
Ju Wang, Liqiong Chang, Shourya Aggarwal, Omid Abari, and Srinivasan Keshav. 2020. Soil moisture sensing with commodity RFID systems. In Proceedings of the 18th International Conference on Mobile Systems, Applications, and Services. 273-285.
Jue Wang and Dina Katabi. 2013. Dude, where's my card? RFID positioning that works with multipath and non-line of sight. In Proceedings of the ACM SIGCOMM 2013 conference on SIGCOMM. 51-62.
Ju Wang, Jianyan Li, Mohammad Hossein Mazaheri, Keiko Katsuragawa, Daniel Vogel, and Omid Abari. 2020. Sensing finger input using an RFID transmission line. In Proceedings of the 18th Conference on Embedded Networked Sensor Systems. 531-543.
Jingxian Wang, Chengfeng Pan, Haojian Jin, Vaibhav Singh, Yash Jain, Jason I Hong, Carmel Majidi, and Swarun Kumar. 2019. RFID Tattoo: A Wireless Platform for Speech Recognition. Proceedings of the ACM on Interactive, Mobile, Wearable and Ubiquitous Technologies 3, 4 (2019), 1-24.
Jue Wang, Deepak Vasisht, and Dina Katabi. 2014. RF-IDraw: virtual touch screen in the air using RF signals. ACM SIGCOMM Computer Communication Review 44, 4 (2014), 235-246.
Ju Wang, Jie Xiong, Xiaojiang Chen, Hongbo Jiang, Rajesh Krishna Balan, and Dingyi Fang. 2017. TagScan: Simultaneous target imaging and material identification with commodity RFID devices. In Proceedings of the 23rd Annual International Conference on Mobile Computing.
Jingxian Wang, Junbo Zhang, Rajarshi Saha, Haojian Jin, and Swarun Kumar. 2019. Pushing the range limits of commercial

(56) References Cited

OTHER PUBLICATIONS passive RFIDs. In 16th {USENIX} Symposium on Networked Systems Design and Implementation ({NSDI} 19). 301-316.

Yinsong Wang, Yajie Zou, Kristian Henrickson, Yinhai Wang, Jinjun Tang, and Byung-Jung Park. 2017. Google Earth elevation data extraction and accuracy assessment for transportation applications. PloS one 12, 4 (2017), e0175756.

Teng Wei and Xinyu Zhang. 2016. Gyro in the air: tracking 3D orientation of batteryless internet-of-things. In Proceedings of the 22nd Annual International Conference on Mobile Computing and Networking. 55-68.

Binbin Xie, Jie Xiong, Xiaojiang Chen, and Dingyi Fang. 2020. Exploring commodity RFID for contactless sub-millimeter vibration sensing. In Proceedings of the 18th Conference on Embedded Networked Sensor Systems. 15-27.

Lei Yang, Yekui Chen, Xiang-Yang Li, Chaowei Xiao, Mo Li, and Yunhao Liu. 2014. Tagoram: Real-time tracking of mobile RFID tags to high precision using COTS devices. In Proceedings of the 20th annual international conference on Mobile computing and networking. 237-248.

Lei Yang, Qiongzheng Lin, Xiangyang Li, Tianci Liu, and Yunhao Liu. 2015. See through walls with COTS RFID system!. In Proceedings of the 21st Annual International Conference on Mobile Computing and Networking. 487-499.

Panlong Yang, Yuanhao Feng, Jie Xiong, Ziyang Chen, and Xiang-Yang Li. 2020. RF-Ear: Contactless Multi-device Vibration Sensing and Identification Using COTS RFID. In IEEE INFOCOM 2020—IEEE Conference on Computer Communications. IEEE, 297-306.

Xiaobin Zhang, Liangfei Xu, Jianqiu Li, and Minggao Ouyang. 2013. Real-time estimation of vehicle mass and road grade based on multi-sensor data fusion. In 2013 IEEE Vehicle Power and Propulsion Conference (VPPC). IEEE, 1-7.

Weida Zhong, Qiuling Suo, Fenglong Ma, Yunfei Hou, Abhishek Gupta, Chunming Qiao, and Lu Su. 2019. A Reliability-Aware Vehicular Crowdsensing System for Pothole Profiling. Proceedings of the ACM on Interactive, Mobile, Wearable and Ubiquitous Technologies 3, 4 (2019), 1-26.

\* cited by examiner

Algorithm 1 Road surface sensing with signal cancellation algorithm

Require:
- Commodity RFID passive system and the vehicle;

Ensure:
- The expected channel traversing over the road surface from the reader to tag $h_{rs}$;

1: Distortion mitigation: Estimating $H'$ and
$$h_{sf} = h_{tr} = \frac{1}{d_{rt}^2} e^{-j2\pi \frac{d_{rt}}{\lambda}} \mod 2\pi;$$

2: Backscattered signal extraction: Obtaining the backscattered signals received at the reader
$$y_b = h_{tb} h_s h_{rt} h_{rs} h_{RZ} zx + h_{tb} h_s h_T h_{rs} h_{RZ} zx;$$

3: Real-time backscattered signal cancellation: Obtaining the expected channel through cancellation
$$y'_b = y_b - y_0 = h_{tb} h_s h_{rt} h_T h_{rs} h_{RZ} zx,$$

where $y_0$ is obtained through equation (4);

4: Return the channel estimation $h_{rs} = \dfrac{h_s}{H' \frac{1}{d_{rt}^2} e^{-j2\pi \frac{d_{rt}}{\lambda}} \mod 2\pi}$

FIG. 9

FIG. 12

METHODS AND SYSTEMS FOR SENSING A ROAD SURFACE

CROSS-REFERENCE TO RELATED APPLICATIONS

This application claims the benefit of U.S. provisional patent application No. 63/370,944, filed on Aug. 10, 2022, and titled "METHODS AND SYSTEMS FOR SENSING A ROAD SURFACE," the disclosure of which is expressly incorporated herein by reference in its entirety.

STATEMENT REGARDING FEDERALLY FUNDED RESEARCH

This invention was made with government support under grant/contract number 1618520 awarded by the National Science Foundation. The government has certain rights in the invention.

BACKGROUND

Vehicles that operate on road surfaces can benefit from sensor systems for determining the shape of a road surface and detecting obstacles on the road surface. Road surfaces can include potholes, bumps, and other irregularities that are hazardous or inconvenient to vehicles. Vehicle-mounted sensor systems for detecting bumps, potholes and other hazards can increase the cost of the vehicle, and add weight. LIDAR (light detection and ranging) and cameras can be used to detect the shape of a road. But these sensors can include significant drawbacks. LIDAR can be heavy and/or expensive. Sensors that use visual-wavelength light (including LIDAR and cameras) can be blocked by smoke, fog, dust, or rain. Thus, there is a need for methods and systems for detecting the shape of a road surface and/or obstacles in a road surface, in particular, methods and systems for detecting the shape of a road surface or obstacles in a road surface using radio frequency signals.

SUMMARY

Methods and systems for sensing a road surface are described herein.

In some aspects, the techniques described herein relate to a method for remote sensing of a road surface including: transmitting, by a transmitting antenna, a radiofrequency signal toward a road surface; receiving, by a first radiofrequency identification (RFID) tag, a first backscattered radiofrequency signal from the road surface; receiving, by a receiving antenna, an RFID signal from the first RFID tag, the RFID signal including phase and magnitude information; and analyzing, by an RFID reader, the phase and magnitude information to determine a condition of the road surface.

In some aspects, the techniques described herein relate to a method, wherein the step of analyzing, by the RFID reader, the phase and magnitude information to determine the condition of the road surface further includes obtaining a road information by performing signal cancelation on the magnitude and phase information; wherein the signal cancelation removes a multipath effect from the phase and magnitude information; and wherein the road information represents a magnitude and phase of a signal reflected by the road surface.

In some aspects, the techniques described herein relate to a method, wherein performing signal cancelation further includes removing a line-of-sight propagation channel between the RFID reader and the RFID tag.

In some aspects, the techniques described herein relate to a method, wherein the step of analyzing, by the RFID reader, the phase and magnitude information to determine the condition of the road surface further includes determining, using the condition of the road surface, a shape of the road surface.

In some aspects, the techniques described herein relate to a method, wherein the condition of the road surface includes a location of one or more bumps, potholes, or irregularities in the road surface.

In some aspects, the techniques described herein relate to a method, wherein the condition of the road surface includes a depth of one or more potholes in the road surface.

In some aspects, the techniques described herein relate to a method, wherein the method further includes receiving, using a second RFID tag, a second backscattered radiofrequency signal.

In some aspects, the techniques described herein relate to a method, wherein the RFID tag and the second RFID tag are spaced on opposite sides of a vehicle.

In some aspects, the techniques described herein relate to a method, wherein the condition of the road surface includes a three-dimensional shape of the road surface, and the method further includes determining the three-dimensional shape of the road surface using the RFID tag and the second RFID tag.

In some aspects, the techniques described herein relate to a method, wherein the phase information includes a phase offset.

In some aspects, the techniques described herein relate to a system for remote sensing of a road surface including: an antenna configured to transmit and receive radiofrequency (RF) signals, wherein the antenna is configured to attach to a front end of a vehicle; at least one radiofrequency identification (RFID) tag, wherein the at least one RFID tag is configured to attach to the front end of the vehicle; and an RFID reader, wherein the RFID reader is configured to: cause the antenna to transmit an RF signal toward a road surface, wherein the at least one RFID tag receives a backscattered RF signal from the road surface; receive, from the antenna, an RFID signal from the at least one RFID tag, the RFID signal including phase and magnitude information; and analyze the phase and magnitude information to determine a condition of the road surface.

In some aspects, the techniques described herein relate to a system, wherein the RFID reader is further configured to analyze the phase and magnitude information to determine the condition of the road surface by obtaining a road information by performing signal cancelation on the magnitude and phase information; wherein the signal cancelation removes a multipath effect from the phase and magnitude information; and wherein the road information represents a magnitude and phase of a signal reflected by the road surface.

In some aspects, the techniques described herein relate to a system, wherein performing signal cancelation further includes removing a line-of-sight propagation channel between the RFID reader and the at least one RFID tag.

In some aspects, the techniques described herein relate to a system, wherein the RFID reader is further configured to determine, using the condition of the road surface, a shape of the road surface.

In some aspects, the techniques described herein relate to a system, wherein the condition of the road surface includes a location of one or more bumps, potholes, or irregularities in the road surface.

In some aspects, the techniques described herein relate to a system, wherein the condition of the road surface includes a depth of one or more potholes in the road surface.

In some aspects, the techniques described herein relate to a system, wherein the system further includes a plurality of RFID tags, wherein a first RFID tag is configured to attach to the front end of the vehicle and a second RFID tag is configured to receive a second backscattered radiofrequency signal.

In some aspects, the techniques described herein relate to a system, wherein the first RFID tag and the second RFID tag are spaced on opposite sides of the vehicle.

In some aspects, the techniques described herein relate to a system, wherein the condition of the road surface includes a three-dimensional shape of the road surface, and the RFID reader is further configured to determine the three-dimensional shape of the road surface using the first RFID tag and the second RFID tag.

In some aspects, the techniques described herein relate to a system, wherein the phase information includes a phase offset.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 9 illustrates an example algorithm for road surface sensing, according to some implementations of the present disclosure.

FIG. 12 illustrates example hardware that can be used to implement an example implementation of the present disclosure.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for detecting potholes and other obstacles in a road surface, it will become evident to those skilled in the art that the implementations are not limited thereto, but are applicable for detecting or measuring the shapes of other surfaces.

Described herein are systems and methods for determining the shape of a road surface using radiofrequency signals.

Figure 1A:
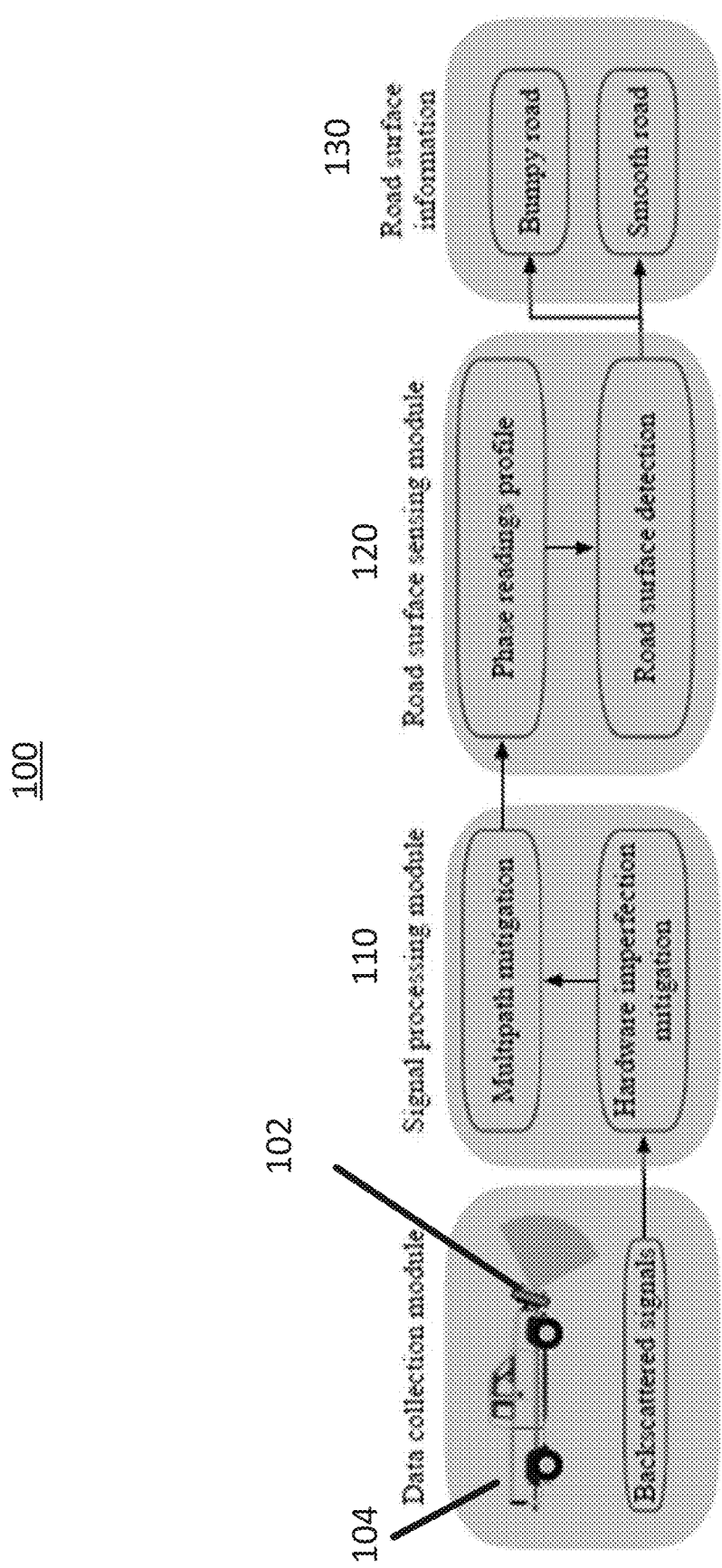
FIG. 1A illustrates a system block diagram of a system for detecting road surface information using backscattered radiofrequency signals, according to implementations of the present disclosure.

With reference to FIG. 1A, a block diagram of a system 100 according to an example implementation of the present disclosure is shown. The system 100 can include an antenna 102 configured to transmit and receive radiofrequency (RF) signals. The antenna can be attached to a vehicle 104, for example on the front of the vehicle 104 as shown in FIG. 1A. The truck shown in FIG. 1A is intended only as a non-limiting example vehicle, and any other type of vehicle can be used in different implementations of the present disclosure. The system 100 can also include an RFID tag located in the same location as the antenna 102 (for example on the front of the vehicle). A non-limiting example of an antenna is a circular polarized antenna with an antenna gain of 11 dBi and a beamwidth of 105 degrees.

Optionally, in some implementations, the system 100 can include a plurality of RFID tags. The RFID tags can be inexpensive passive RFID tags. A non-limiting example of a passive RFID tag is the ALN-9662, sold under the trademark Alien Technologies. Another non-limiting example of a passive RFID tag is the 4D, sold under the trademark Impinj Monza 4. Yet another non-limiting example of a passive RFID tag is the R6-P tag, sold under the trademark Monza.

The present disclosure contemplates that the RFID reader can be implemented using any receiver. A non-limiting example of an RFID reader is the general purpose radio receiver sold under the trademark USRP N200 by Ettus Research.

The system 100 can further include an RFID reader configured to cause the antenna 102 to transmit a radiofrequency signal toward a road surface (not shown).

The RFID tag can be configured to receive a backscattered RF signal from the road surface. The RFID reader can be further configured to receive from the antenna, an RFID signal from the RFID tag. The RFID signal can include both phase and magnitude information from the backscattered signal.

Still with reference to FIG. 1A, the system 100 can include modules 110 120 to determine the condition of the road based on the backscattered signal. In some implementations of the present disclosure, the modules 110 120 can be implemented using a computing device (e.g., the computing device 200 shown in FIG. 2). The computing device 200 can optionally be part of the RFID reader.

A signal processing module 110 can perform hardware and multipath mitigation methods to identify the backscattered signal. Optionally, the signal processing module 110 can be configured to remove multipath signals, and/or to remove errors caused by hardware variations. The signal processing module 110 can remove multipath signals by performing as signal subtraction. Examples of signal subtraction are described with respect to the examples below.

Alternatively or additionally, the signal processing module 110 can perform distortion mitigation. As another example, the signal processing module can extract the backscattered signal received at the reader. The signal processing module 110 can output information that represents the phase and magnitude of the backscattered signal from the roadway, and that information can be input into the road surface sensing module 120. Additional details of an example implementation of the signal processing module is described further with respect to the examples described herein.

A road surface sensing module 120 can determine the shape of the roadway based on the phase and/or magnitude of the backscattered signal by analyzing the phase and magnitude information from the backscattered signal. In some implementations, a pothole or other disruption to the road surface can be detected as a peak and/or trough in a phase profile of the backscattered signal, as described in the example below with reference to FIGS. 22A and 22B. The road surface sensing module 120 can output the road surface information 130. Non-limiting examples of road surface information include the roughness or smoothness of the road, the shape of the road, the location of the road, and the size, shape and location of any kind of feature on the road. Examples of road features include bumps in the road, potholes, and objects in the road.

Figure 1B:
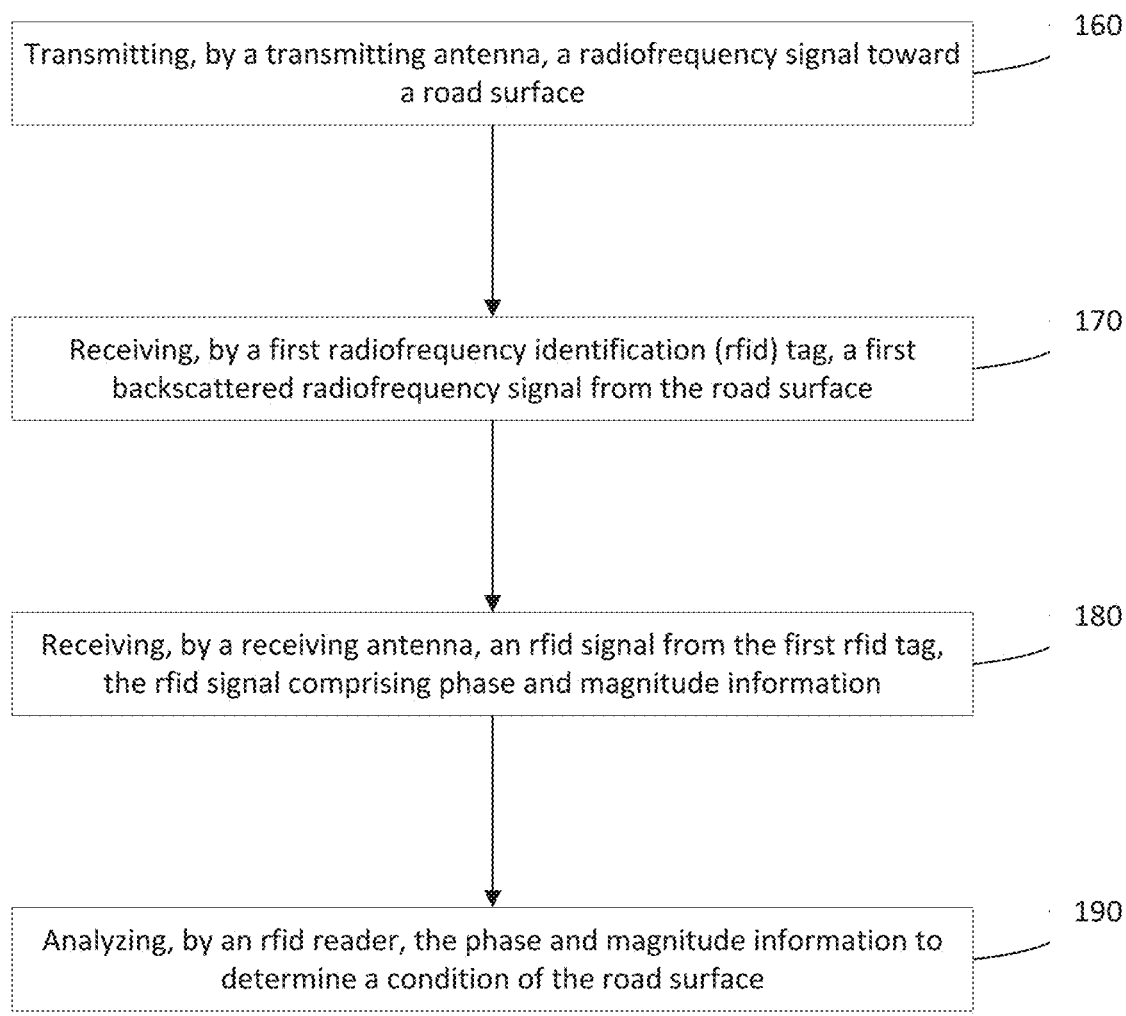
FIG. 1B illustrates a flowchart of a method for detecting road surface information using backscattered radiofrequency signals, according to implementations of the present disclosure.
Figure 3:
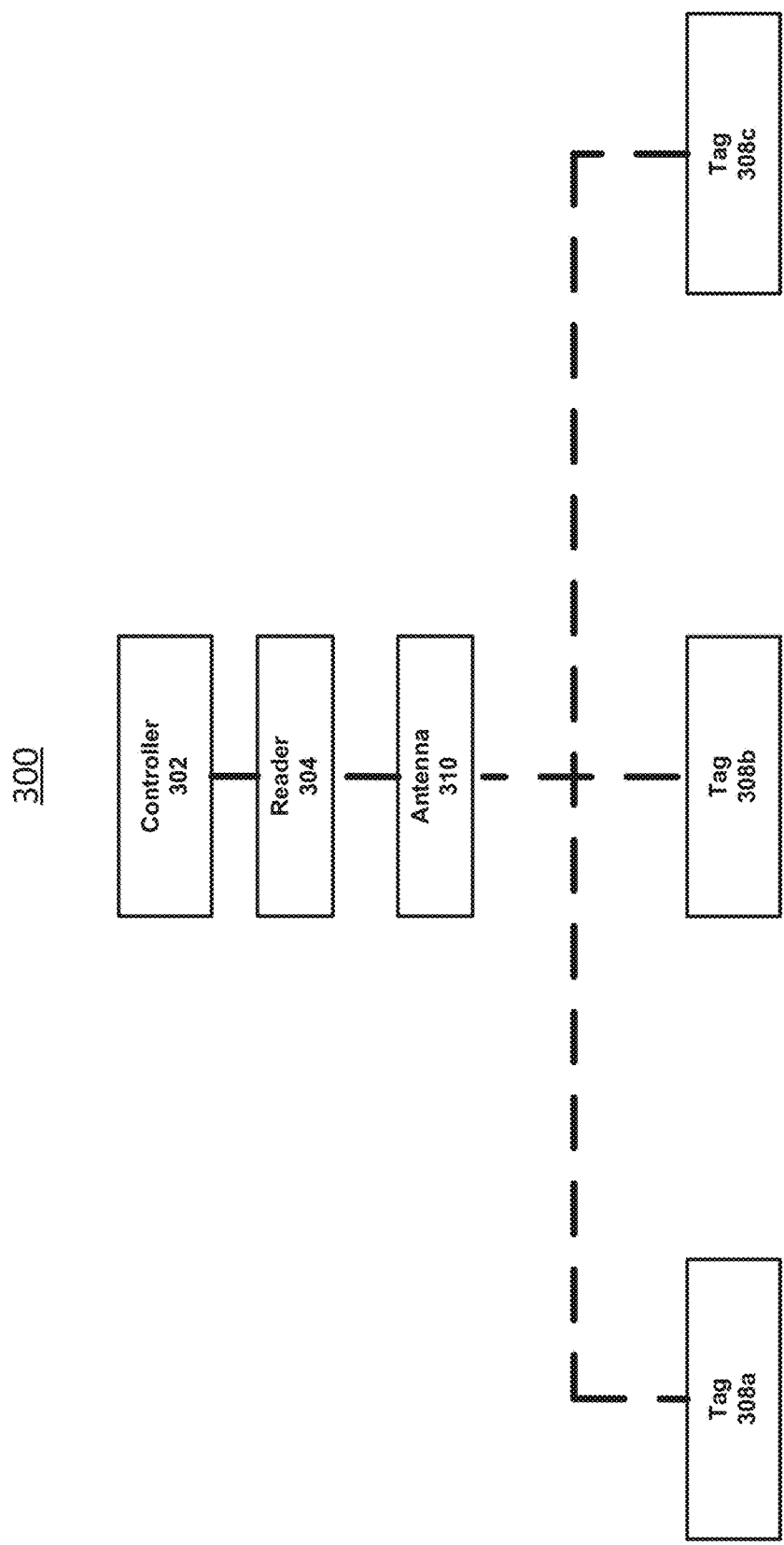
FIG. 3 illustrates a system block diagram of a system for detecting road surface information using backscattered radiofrequency signals, according to implementations of the present disclosure.

Implementations of the present disclosure include methods for performing remote sensing of a road surface using backscattered signals. An example method 150 is illustrated in FIG. 1B. The example method 150 can optionally be implemented using the system 100 illustrated in FIG. 1A. For example, the system 100 can be configured to perform any/all of the steps of the method 150. The example method 150 can optionally be implemented using the system 300 illustrated in FIG. 3. It should be understood that the systems shown in FIGS. 1 and 3 are provided only as examples. This disclosure contemplates implementing the example method 150 using other systems.

At step 160, the example method can include transmitting, by a transmitting antenna, a radiofrequency signal toward a road surface.

At step 170, the example method can include receiving, by a first radiofrequency identification (RFID) tag, a first backscattered radiofrequency signal from the road surface.

At step 180, the example method can include receiving, by a receiving antenna, an RFID signal from the first RFID tag, the RFID signal including phase and magnitude information.

At step 190, the example method can include analyzing, by an RFID reader, the phase and magnitude information to determine a condition of the road surface. Optionally, the phase information can include a phase offset.

In some implementations, step 190 can further include obtaining a road information by performing signal cancelation on the magnitude and phase information; wherein the signal cancelation removes a multipath effect from the phase and magnitude information; and wherein the road information represents a magnitude and phase of a signal reflected by the road surface. Optionally, performing signal cancelation can include removing a line-of-sight propagation channel between the RFID reader and the RFID tag.

Alternatively or additionally, step 190 can further include determining, using the condition of the road surface, a shape of the road surface.

Optionally, the condition of the road surface can include the location of one or more bumps, potholes, or irregularities in the road surface. In some implementations, the condition of the road surface includes the depth of one or more potholes in the road surface.

In some implementations, the method 150 can further include receiving a second backscattered radiofrequency signal using a second RFID tag. In some implementations, the second RFID tag can be spaced from the RFID tag (e.g., one tag can be on the driver side of the vehicle and another tag can be on the passenger side of the vehicle).

In some implementations, the condition of the road surface includes a three-dimensional shape of the road surface, and the method further includes determining the three-dimensional shape of the road surface using the RFID tag and the second RFID tag.

With reference to FIG. 3, a system 300 for remote sensing of a road surface is illustrated according to an example implementation of the present disclosure. The system 300 can include a controller 302 that can be configured to perform any of the steps described with reference to FIG. 1B. Optionally, the controller 302 can include a computing device, for example the computing device 200 shown in FIG. 2.

The system 300 can include an antenna 310 configured to transmit and receive radiofrequency (RF) signals. In the example herein where the antenna 310 is used to determine the condition of a road surface, the antenna can be attached to the front end of a vehicle. Optionally, the antenna 310 can be positioned in other locations to perform different sensing operations.

The system can further include at least one radiofrequency identification (RFID) tag 308a. Optionally, the RFID tag can be attached to the front end of a vehicle. In some implementations, there can be more than one RFID tag in the system, and the system 300 shown in FIG. 3 shows 3 tags 308a, 308b, 308c as a non-limiting example.

The system 300 can further include an RFID reader 304. The RFID reader 304 can be configured to cause the antenna 310 to transmit an RF signal toward a road surface, where the at least one RFID tag 308a, 308b, 308c receives a backscattered RF signal from the road surface; receive, from the antenna 310, an RFID signal from the at least one RFID tag 308a, 308b, 308c, the RFID signal comprising phase and magnitude information; and analyze the phase and magnitude information to determine a condition of the road surface. The RFID reader 304 can be operably connected to the controller 302.

In some implementations, the RFID reader 304 can be further configured to analyze the phase and magnitude information to determine the condition of the road surface further comprises obtaining a road information by performing signal cancelation on the magnitude and phase information; where the signal cancelation removes a multipath effect from the phase and magnitude information. As described throughout the present disclosure, the road information can optionally represent a magnitude and phase of a signal reflected by the road surface. Optionally, the phase information can further include a phase offset.

The RFID reader 304 can optionally be configured to perform signal cancelation by removing a line-of-sight propagation channel between the RFID reader 304 and one or more of the RFID tag(s) 308a, 308b, 308c.

The system 300 can be configured to determine different conditions of the road surface. Non-limiting examples of conditions of the road surface include one or more bumps, potholes, or irregularities in the road surface, and the depth of potholes in the road surface. Alternatively or additionally, the RFID reader 304 can be configured to determine a shape of the road surface based on the condition of the road surface.

In implementations of the present disclosure including more than one tag, the additional tags can be configured to receive additional backscattered radiofrequency signals. For example, in FIG. 3, the second tag 308b can be configured to receive a second backscattered radiofrequency signal, and a third tag 308c can be configured to receive a third backscattered radiofrequency signal. As described herein, any number of tags and backscattered radiofrequency signals can be used in implementations of the present disclosure.

Additionally, in some implementations of the present disclosure, the tags 308a, 308b, 308c can be spaced around different parts of a vehicle. For example, the first tag 308a and second tag 308b can be positioned on opposite sides of a vehicle.

Implementations of the present disclosure including more than one tag can be configured to determine a three-dimensional shape of a road surface using the first tag 308a and second tag 308b.

Figure 6A:
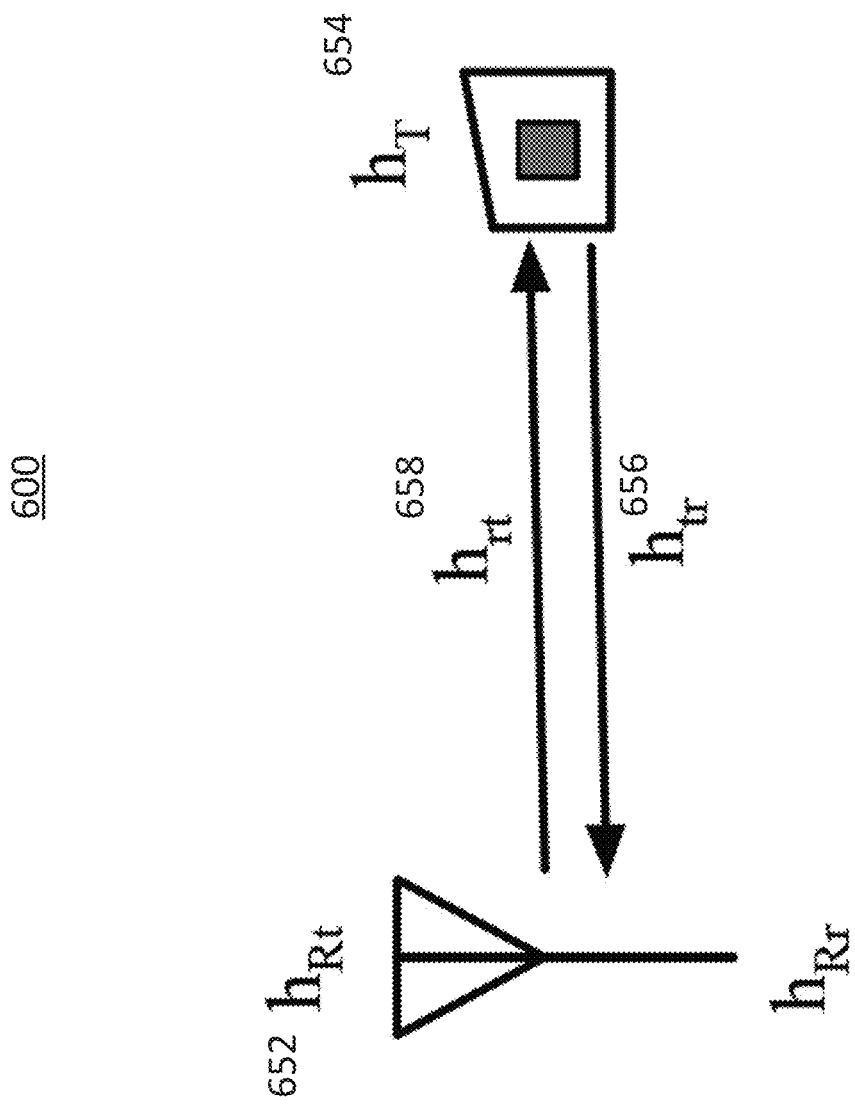
FIG. 6A illustrates modeling the propagation of the backscattered signal when there are no other objects around the commodity passive RFID system.

With reference to FIG. 6A, a schematic 600 illustrates an RFID reader 652 and an RFID tag 654. The schematic 600 shows the $h_{rt}$ channel 658 from the reader to the tag. The schematic 600 also shows the $h_{tr}$ 656 channel from the tag to the RFID reader 652.

Figure 6B:
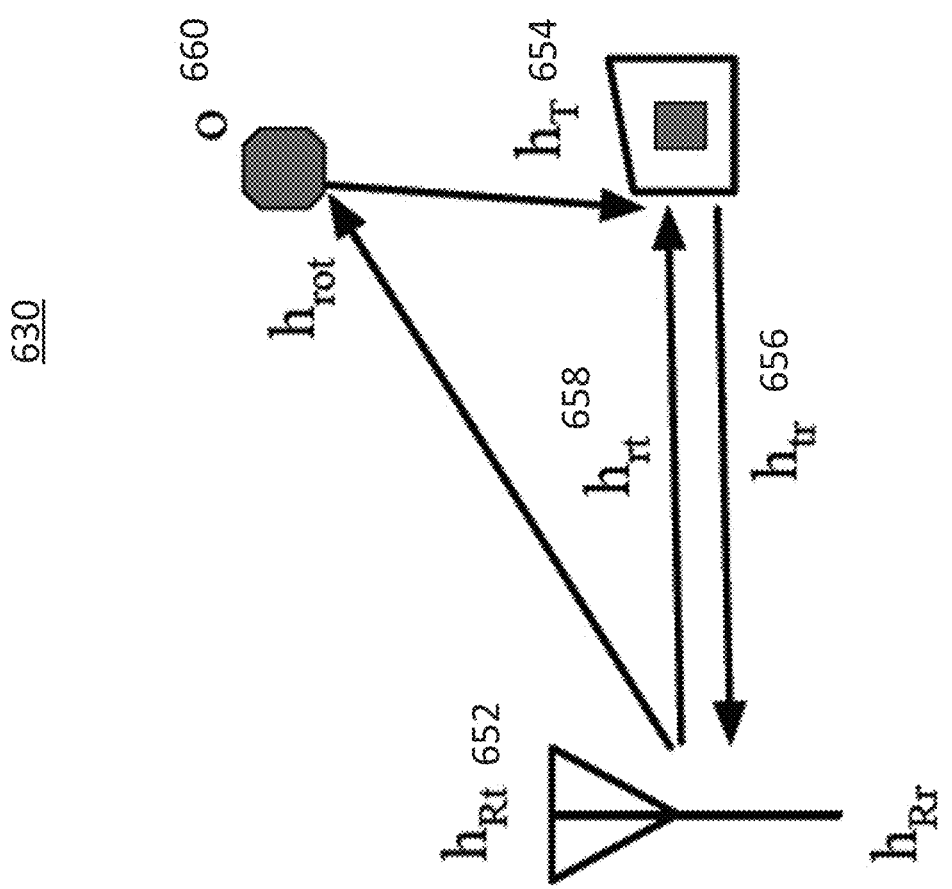
FIG. 6B illustrates modeling the propagation of the backscattered signal when there are other objects around the commodity passive RFID system.

With reference to FIG. 6B, a schematic 630 illustrates an RFID reader 652 and an RFID tag 654. The schematic 630 shows the $h_{rt}$ channel 658 from the reader to the tag. The schematic 600 also shows the $h_{tr}$ 656 channel from the tag to the reader. The schematic 630 further shows an object 660. The object 660 can be an object other than a road surface.

Figure 6C:
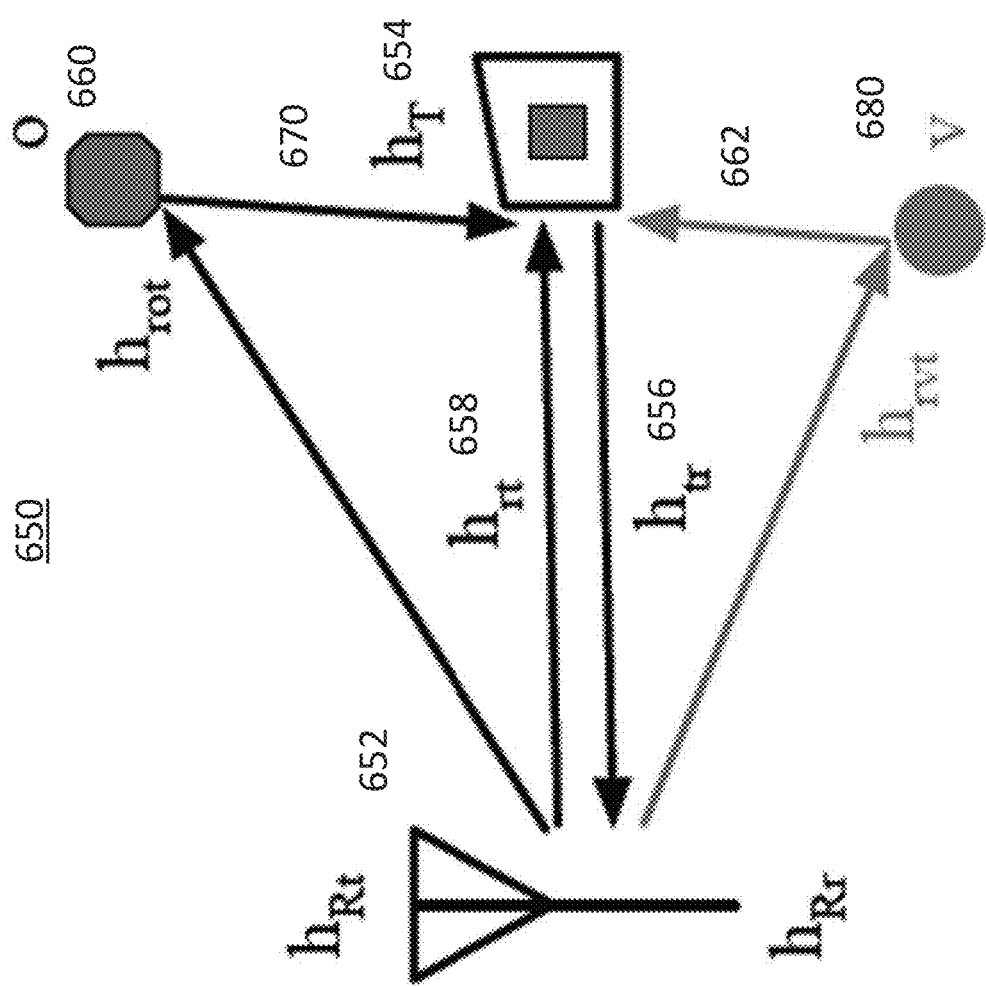
FIG. 6C illustrates modeling the propagation of the backscattered signal including extracting the reflection from the road surface (i.e., denoted as v) through the cancellation.

With reference to FIG. 6C, a schematic 650 illustrates an RFID reader 652 and RFID tag 654. The $h_{rt}$ channel 658 represents signals passing directly from the RFID reader 652 to the RFID tag 654. The $h_{tr}$ 656 is also shown. An object 660 other than the road surface is also illustrated as in FIG. 6B. Signals from the RFID reader 652 are reflected off the object 660 to the RFID tag 654, shown as the object reflection path 670. Examples of objects include parts of the vehicle that the RFID tag 654 is located on.

Signals from the RFID reader 152 also reflect off the road surface 680 to the tag, along the road surface reflection path 662.

Implementations of the present disclosure can include methods to determine what signals received at the RFID tag 654 are due to the road surface reflection path 662. Implementations of the present disclosure can analyze, using RFID reader, the phase and magnitude information received at the RFID tag 654 to determine the condition of the road surface 680 by performing signal cancelation on the magnitude and phase information. Signal cancelation can remove a multipath effect from the phase and magnitude information, and therefore remove the portion of the phase and magnitude that is attributable to the object reflection path.

Signal cancelation can also be performed to remove the portion of the phase and magnitude information that is due to the direct signal path shown as the $h_{rt}$ channel 658 between the RFID reader 652 and RFID tag 654.

While FIGS. 6A-6C show an RFID reader 652 and RFID tag 654, it should be understood that any number or combination of RFID readers and RFID tags can be used. It should also be understood that the RFID readers and RFID tags can be spaced around the vehicle to sense information about the road surface across a larger area. As a non-limiting example, two tags can be placed on opposite sides of the same vehicle.

It should be appreciated that the logical operations described herein with respect to the various figures may be implemented (1) as a sequence of computer implemented acts or program modules (i.e., software) running on a computing device (e.g., the computing device described in FIG. 2), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 2:
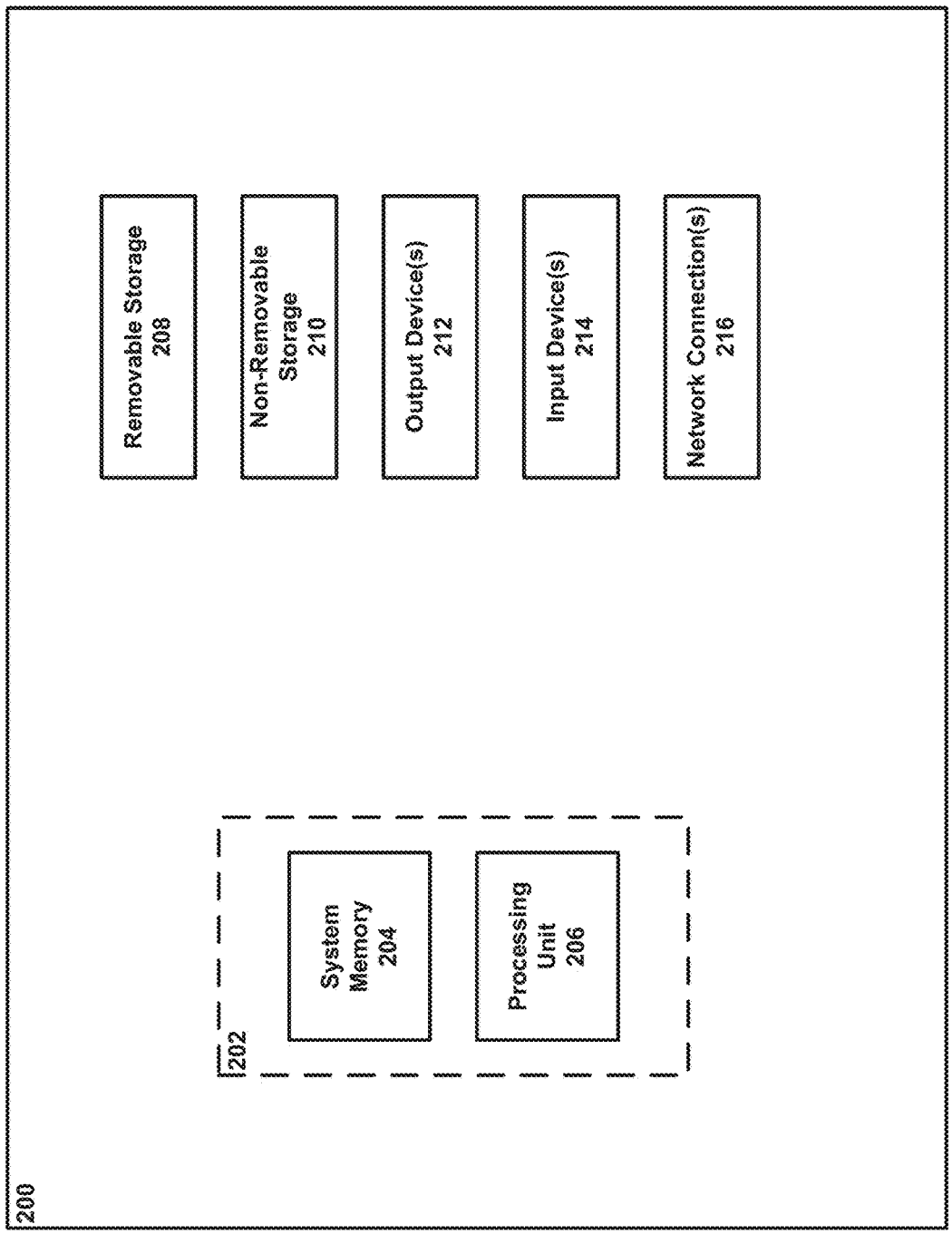
FIG. 2 is an example computing device.

Referring to FIG. 2, an example computing device 200 upon which the methods described herein may be implemented is illustrated. It should be understood that the example computing device 200 is only one example of a suitable computing environment upon which the methods described herein may be implemented. Optionally, the computing device 200 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 200 typically includes at least one processing unit 206 and system memory 204. Depending on the exact configuration and type of computing device, system memory 204 may be volatile (such as random access memory (RAM)), non-volatile (such as read-only memory (ROM), flash memory, etc.), or some combination of the two. This most basic configuration is illustrated in FIG. 2 by dashed line 202. The processing unit 206 may be a standard programmable processor that performs arithmetic and logic operations necessary for operation of the computing device 200. The computing device 200 may also include a bus or other communication mechanism for communicating information among various components of the computing device 200.

Computing device 200 may have additional features/functionality. For example, computing device 200 may include additional storage such as removable storage 208 and non-removable storage 210 including, but not limited to, magnetic or optical disks or tapes. Computing device 200 may also contain network connection(s) 216 that allow the device to communicate with other devices. Computing device 200 may also have input device(s) 214 such as a keyboard, mouse, touch screen, etc. Output device(s) 212 such as a display, speakers, printer, etc. may also be included. The additional devices may be connected to the bus in order to facilitate communication of data among the components of the computing device 200. All these devices are well known in the art and need not be discussed at length here.

The processing unit 206 may be configured to execute program code encoded in tangible, computer-readable media. Tangible, computer-readable media refers to any media that is capable of providing data that causes the computing device 200 (i.e., a machine) to operate in a particular fashion. Various computer-readable media may be utilized to provide instructions to the processing unit 206 for execution. Example tangible, computer-readable media may include, but is not limited to, volatile media, non-volatile media, removable media and non-removable media implemented in any method or technology for storage of information such as computer readable instructions, data structures, program modules or other data. System memory 204, removable storage 208, and non-removable storage 210 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 206 may execute program code stored in the system memory 204. For example, the bus may carry data to the system memory 204, from which the processing unit 206 receives and executes instructions. The data received by the system memory 204 may optionally be stored on the removable storage 208 or the non-removable storage 210 before or after execution by the processing unit 206.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Examples

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

An example implementation of the present disclosure was designed and tested for sensing road surface information. Road surface information (e.g., smooth road or bumpy road with potholes or bumps) is important for safe driving (i.e., it's necessary to be aware of the road surface conditions during driving). However, high-cost sensor (e.g., LiDAR and camera) based road surface sensing approaches cannot work properly in inclement weather conditions (e.g., fogging and snowing) due to the line-of-sight requirement. The low-cost and ubiquitous smartphone-based road surface sensing approach is not reliable and safe to use, since it relies on the vibration of the vehicle body to sense the road surface (i.e., the vehicle's tires need to touch the bumps on the road surface). Implementations of the present disclosure can automate the contact-free road surface sensing with low-cost sensors for safe driving without requiring the vehicle's tires to touch the bumps on the road surface.

The example implementation is referred to herein as "Tago." The example implementation includes a system that can achieve contact-free road surface sensing with commodity passive RFID tags. Instead of deploying RFID tags or readers along the road or lamp post (i.e., infrastructure-based deployment), the example system can deploy the reader inside of the vehicle and attach the tag and the reader's antenna at the front end of the vehicle like the vehicle's headlights (i.e., infrastructure-free deployment). The example implementation can include methods to analyze the variation of composite signals received at the reader. The example implementation can further include a signal cancellation approach to extract the clean reflections from the road surface, such that the example implementation can accurately sense the road surface conditions for safe driving. The example implementation was validated in experiments with different vehicles (e.g., Honda Civic Frankenfish, Folsom, Flutter and CR-V Warner) driven on different roadways (e.g., urban and residential area). The example experiments described herein show that Tago can effectively sense the road surface information.

Bad road surface conditions (e.g., bumps or potholes on the road surface) are caused by severe and dynamic weather conditions, unexpected and heavy traffic loads and the normal wear/tear. Even though the governments around the world spend significant resources on maintaining the quality of the roadways, the bad road surface conditions are still hazardous to drivers and pedestrians [19]. It is difficult for governments to maintain the good quality of roadways in the long term due to the limited municipal budgets. Also, the process of road maintenance can last a long period of time, which can further cause traffic congestion in some main roadways. So, roadways are unlikely to be smooth all the time. These bad road surface conditions could approximately cause $3 billions in property damage every year [2], and degrade the efficiency of the vehicles (e.g., waste the fuel) as the vehicle is driven on bumpy road instead of the smooth road. Bad road surface conditions become even worse for the autonomous driving systems, which can require robust and reliable machine learning models to capture the complex road surface conditions. Therefore, sensors that can the vehicular systems or drivers to be aware of the road surface conditions for economic and safe driving. [17].

Camera, radar or LiDAR-based road surface sensing. The straightforward solution is to instrument the high-cost and advanced sensors (e.g., camera, radar or LiDAR sensor) on the vehicle [1] to accurately sense the road surface conditions, which have been employed by modern autonomous vehicles (e.g., Waymo [39]). However, these sensors are expensive. More importantly, camera and LiDAR sensors require line-of-sight to work properly, which is not reliable in inclement weather conditions (e.g., fogging and snowing).

Smartphone or crowd-sourced smartphone-based road surface sensing. Recently, low-cost IMU sensors (e.g., GPS, magnetometer, gyroscope and accelerometer) embedded in the smartphone are leveraged to sense the road surface conditions [9,21]. However, these smartphone-based or crowd-sourced smartphone-based approaches cannot provide reliable road surface sensing, since the smartphone's MEMS sensors are prone to noise, drifts and biases. More importantly, they cannot achieve contact-free road surface sensing for safe driving and alert the drivers of the hazardous road conditions ahead, since they sense the road surface based on the vibration of the vehicle's body which requires the vehicle's tires to touch the bumps. Therefore, implementations of the present disclosure that include low-cost, ubiquitous and contact-free road surface sensing for safe driving can be advantageous.

Commodity passive RFID system can be used for ubiquitous sensing (e.g., touch sensing [16, 33], soil moisture sensing [31], food/liquid sensing [12, 36], gesture recognition [14, 34, 35], etc.) due to its low cost and small form factor. Note that smartphones can be used as an RFID reader [5,8]. Since the commodity passive RFID relies on the radio frequency signals to sense the objects (e.g., road surface), it can inform the driver of the hazardous road conditions ahead before the vehicle's tires touch the bumps on the road surface. Therefore, commodity passive RFIDs can automate contact-free road surface sensing for safe driving. RFIDs are low-cost and can be the complement of camera/lidar/radar systems in NLOS scenarios. Moreover, Tago's design is not inherited from the tag. So, Tago's design can be general to any backscatter sensors including the active tags. Sensors such as Lidar sensors, may not provide the large enough signal wavelength to penetrate fog, rain and snow [10, 18, 22, 24]. Typically, the Lidar signal has the wavelength smaller than 0.01 mm. Fog particles have the size of 10 to 15 mm and rain drops have the size of 0.5 to 5 mm, which are larger than 0.01 mm.

Figure 7A:
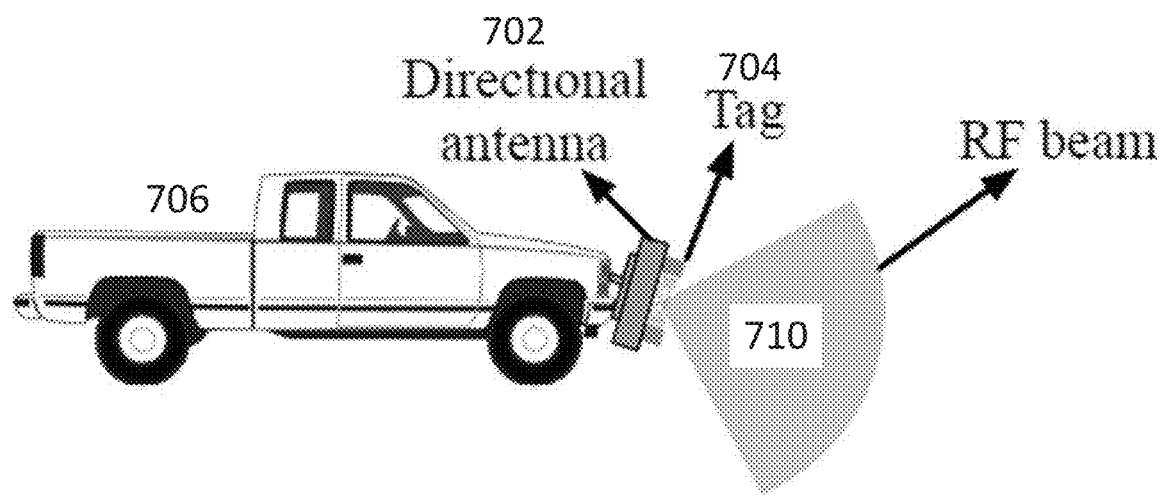
FIG. 7A illustrates an example system diagram for an example implementation of the present disclosure.
Figure 7B:
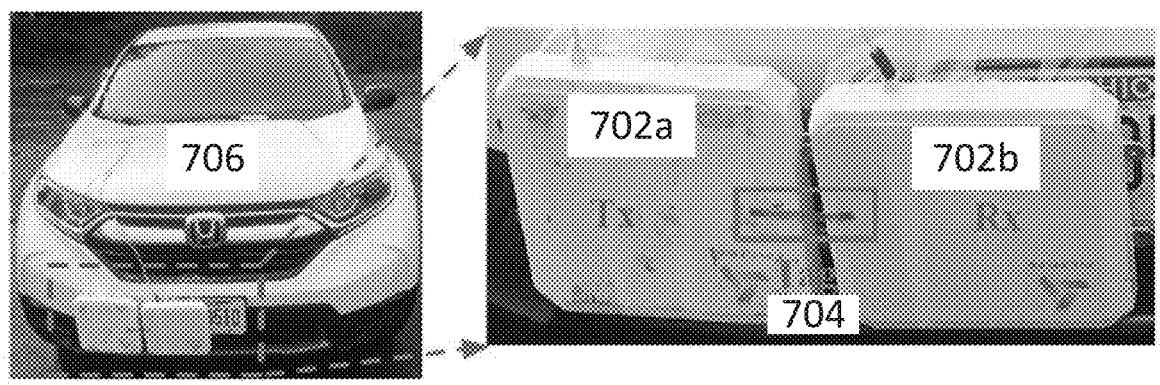
FIG. 7B illustrates an example implementation of the present disclosure on a personal car, according to an example implementation of the present disclosure.

The example implementation of Tago can include a system that can sense the road surface conditions using the commodity passive RFID system for safe driving. To do so, the system deploys the RFID reader in the vehicle and attach the RFID tags at the front end of the vehicle to achieve contact-free sensing as shown in FIG. 7A. FIG. 7B illustrates the arrangement of tags and antennas on the front of an example vehicle. FIG. 7A-7B illustrate a diagram of Tago's architecture. The RFID reader's antenna 702 and RFID tag 704 are attached at the front end of the vehicle 706 to achieve contact-free road surface sensing. Specifically, the reader's antennas (i.e., Tx antenna 702a and Rx antenna 702b) are attached at the front end of the vehicle 706 and the RFID tag 704 is attached on the reader's antenna 702. The shadow area 710 in front of the vehicle 706 in FIG. 7A indicates the RF beam transmitted from the reader's antenna 702. So, the sensing area of Tago is the road surface in front of the vehicle. Specifically, the backscattered signals reflected off the road surface can be analyzed to sense bumps or potholes on the road surface.

To achieve the contact-free sensing, the system may not be able to attach RFID tags on the road surface like the other RFID-tagged objects sensing [30, 32, 35]. The other infrastructure-based settings (e.g., deploying reader on the lamp post [3]) are not appropriate in the example scenario. Second, the backscattered signals reflected off the road surface will be drown in the direct-path signals, which can degrade the sensing sensitivity using composite signals received at reader to sense the road surface. Moreover, the hardware distortion of tags/reader will introduce extra phase offset to the backscattered signals. And, the bumps can be randomly distributed on the road surface.

The example implementation can include a window-sized signal cancellation approach to obtain the weak reflection from the road surface (i.e., an emerging technique put forward in recent years [43]), including cancelling out the reflections from other objects (e.g., vehicle's body and curb). Note that the pedestrians on the sidewalk and the other vehicles passing by will not be captured by the tags attached at the front end of the vehicle, the example implementation can harness the orientation sensitivity of RFID system by facing the tag and reader's antenna to the road surface. The example implementation can also mitigate the hardware imperfections of tag and reader through one-time calibration. Since the commodity passive RFID system is orientation-sensitive, it can deploy two tags on the vehicle (e.g., the vehicle's headlights) to detect the randomly distributed bumps on the road surface.

The prototype of Tago with USRP N210 as the RFID reader and the general-purpose commodity passive RFID tags was constructed. The experiments described herein show that Tago can accurately sense the road surface conditions. The prototype of Tago can be used on different vehicles (e.g., Honda Civic Flutter, Frankenfish, Folsom and CR-V Warner). The experiments of the example study described herein were performed on a campus road, residential area and urban area. The experimental results show the capability of Tago on contact-free road surface sensing. The experimental results show that Tago can be a contact-free road surface sensing system for safe driving, using commodity passive RFID tags attached at the front end of the vehicle.

Examples of Tago's system settings are also described herein, including a window-sized signal cancellation approach to obtain the weak reflection from the road surface. To achieve reliable sensing, the example system can attache two RFID tags at the front end of the vehicle (like the vehicle's headlights) to sense the randomly distributed bumps on the road surface.

The extensive experimental results described herein show the efficiency of Tago's design on road surface sensing.

The road surface condition can be obtained through the remote sensing, using the satellites or aerial imagery [38]. The remote sensing approaches can achieve large-scale sensing. But, it can cause the high-cost deployment and data collection, especially when there are frequent updates to the sensing data. More importantly, this expensive remote sensing approach provides the poor accuracy and cannot provide the fine-grained road surface information (e.g., bumps on the road surface). To improve the sensing accuracy, advanced sensors can be deployed (e.g., cameras and LiDAR sensors) on the vehicle to sense the road surface [1, 13, 45]. For example, the Automatic Road Analyzer (ARAN [1]) is a vehicle instrumented with many high-quality sensors such as laser, camera and LiDAR to collect the road surface information, by fusing all these sensing data. These sensors can detect and localize the bumps on the road surface, estimate the road grade for efficient fuel usage and measure the dimension of the pothole with high accuracy. The high accuracy is achieved with these expensive sensors, which can just work properly in line-of-sight scenario. The high deployment cost limits its scalability. Moreover, these sensors perform poorly in bad weather conditions such as fogging and snowing. The current autonomous vehicles (e.g., Tesla and Waymo [39]) highly rely on these sensors, since these sensors can provide high accuracy with deep learning algorithms. However, they have high computational complexity and deployment cost to train the deep neural networks in different weather conditions to have robust system.

Obviously, these advanced and expensive sensors could provide high accuracy in line-of-sight scenario. But, they cannot work properly in non-line-of-sight scenario such as fogging and snowing. To alleviate the high cost and achieve ubiquitous sensing, the smartphone-based road surface sensing has been exploited, as the ubiquitous smartphone is embedded with different kinds of IMU sensors such as magnetometer, gyroscope, GPS and accelerometer [9,11,21,25,46], which can be leveraged to sense the road surface.

FIG. 1A illustrates an example workflow that can be implemented by Tago. Tago can implement two main modules: signal processing module and road surface sensing module. Tago's flow of operations includes the following steps: (1) The reader will receive the backscattered signals from the tag; (2) The hardware imperfections of tag and reader's antennas should be mitigated with one-time calibration, since the tag and reader's hardware imperfections are constant; (3) the example implementation can mitigate the multipath effect through signal cancellation. Since tag and reader's antennas are deployed at the front end of the vehicle as shown in FIGS. 7A-7B, the example implementation can cancel the reflections from the vehicle's body, curb and the direct-path signals between reader's antenna and the tag. After the signal cancellation, the remaining part will be the backscattered signal reflected off the road surface; (4) The example implementation mainly extracts the phase readings from the backscattered signals reflected off the road surface for road surface sensing. To differentiate the bumpy and smooth road surface, the example implementation compares the variance of phase readings to the predefined threshold. The bumps or potholes on the road surface will introduce significant phase variation to the phase readings.

Figure 4A:
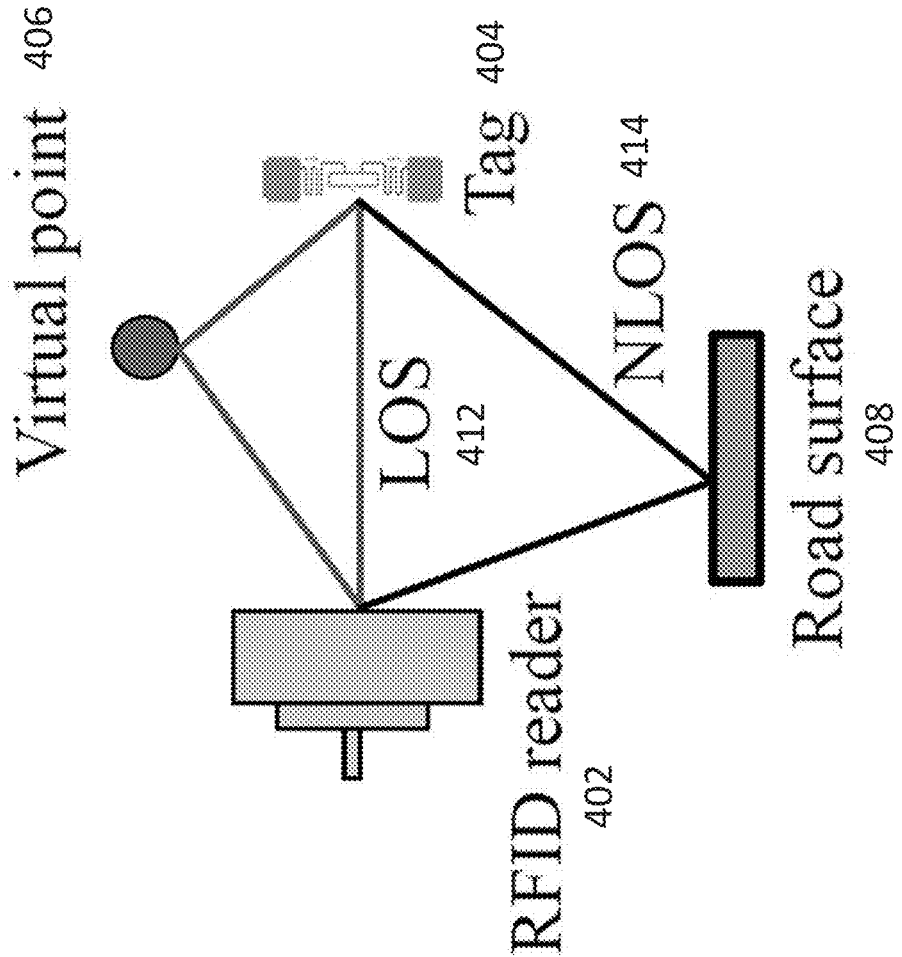
FIG. 4A illustrates back-and-forth signal propagation, according to an example implementation of the present disclosure.
Figure 4B:
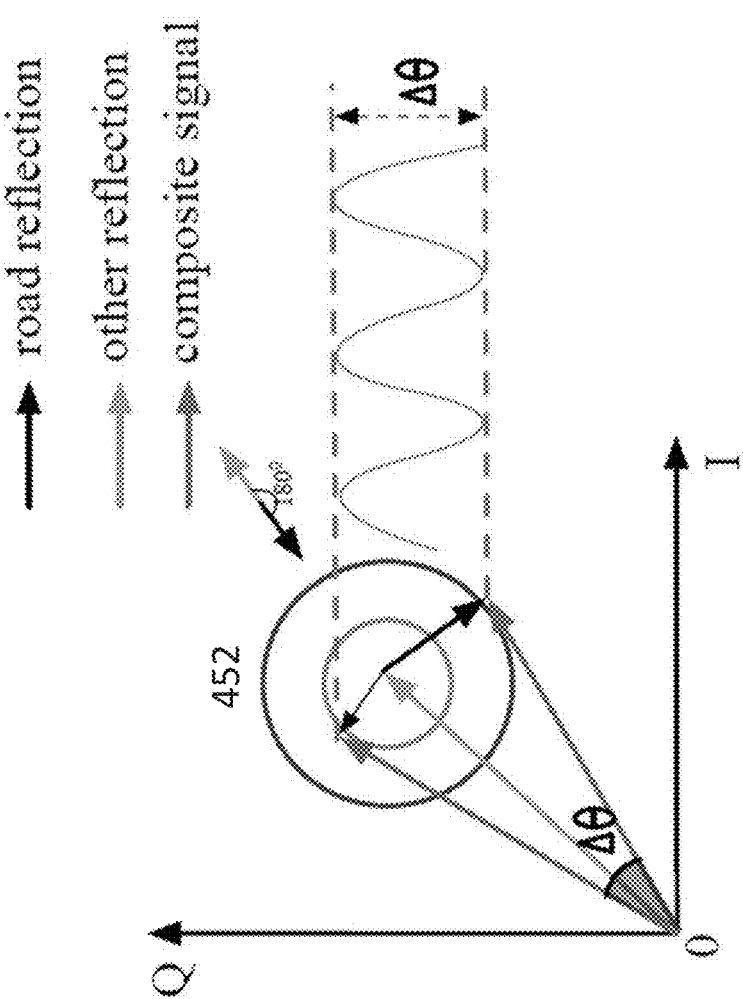
FIG. 4B illustrates a vector representation of signal paths in IQ domain, according to an example implementation of the present disclosure.

FIG. 4A illustrates back-and-forth signal propagation between the reader 402 and tag 404 (i.e., LOS path), and the NLOS signal propagation reflected off the virtual point 406 (e.g., road curb and vehicle's body) and road surface 408. FIG. 4B illustrates a vector representation of signal paths in ICI domain. The variation of road surface can cause the variation of backscattered signals received at the reader.

Since the passive RFID tags can be battery-free, they can be activated by the external reader through the high-power signals (i.e., continuous wave). The transmitted signal from the reader can be $S_{rt}=|S_{rt}|e^{j\theta_r}$ ($\theta_r$ denotes the phase offset due to the reader's hardware imperfection), which will be propagated to the nearby tags. The tag will receive signals $S_t=S_{rt}h_rh_t$, $h_{rt}=|h_{rt}|e^{j\theta_{rt}}$, $h_t=|h_t|e^{j\theta_t}$, where $h_{rt}$ denotes the wireless channel from the reader to the tag and h t denotes the tag's antenna gain. The reflection coefficient is $\alpha=|\alpha|e^{j\theta_\alpha}$, which can be a constant value given the specific RFID tag. The received signals at the tag will be backscattered to the reader through ON-OFF keying modulation. Then, the reader can receive tag's reflections $S_{rr}=S_t\alpha h_t h_{tr}=S_{rt}\alpha h_t^2 h_\alpha^2=|S_{rt}\alpha h_t^2 h_\alpha^2|e^{j(\theta_r\theta_\alpha+2\theta_\alpha+2\theta_t)}$, where $\theta_\alpha\theta_{rt}$, $\theta_\alpha=\theta_{tr}$ and $h_\alpha=h_{rt}=h_{tr}$ due to the reciprocity property of the wireless channel.

When the reader receives the backscattered signals from the tag, the system can extract the signal strength and phase. The received signal strength of the backscattered signal is denoted as follows:

$$\text{Signal strength}=20\log|S_{rr}|=20\log|S_{rt}|+20\log|\alpha|+40\log|h_\alpha|+40\log|h_t|$$

The received signal phase of the backscattered signal is denoted as follows:

$$\text{Signal phase}=\theta_r+\theta_\alpha+2\theta_\alpha+2\theta_t$$

Since the phase readings can provide finer resolution than the amplitude readings [20, 30, 32, 35, 40, 42], most of the work employs the phase readings to do RFID-based sensing. So, the example implementation can also leverage the signal phase extracted from tag's backscattered signals to achieve road surface sensing. Note that the extracted signal phase from the backscattered signals can be related to the hardware imperfection of the tag (i.e., $\theta_t$, $\theta_\alpha$) and reader (i.e., $\theta_r$).

In the example implementation, there are two types of backscattered signals between the reader and the tag: line-of-sight (LOS) signals and non-line-of-sight (NLOS) signals as shown in FIGS. 4A-4B. The signals directly propagated between the reader's antenna and the tag indicate the LOS path 412. There can be other objects (e.g., vehicle's body) which can reflect the signals. These can be considered as a virtual point 406. The virtual point 406 and road surface 408 can cause the NLOS signal transmission.

The vector representation of LOS path 412 and NLOS signal path 414 are shown in FIG. 4B. The LOS path 412 and the signal path traversing over the virtual point 406 can be seen as the static component. The reflection from the road surface can be regarded as the dynamic component due to the change of road surface (e.g., from smooth to bumpy). Since the road surface can change, the backscattered signals from the road surface can change (i.e., amplitude or phase variation) due to the different propagation distance. The size of the circle 452 illustrated in FIG. 4B can indicate the signal amplitude reflected off the road surface. The reader can receive the composite signals. When the phase difference between the static component and the average dynamic component is 180° as shown in FIG. 4B, there is a phase variation (i.e., $\Delta\theta$) of the composite signals.

Figure 5B:
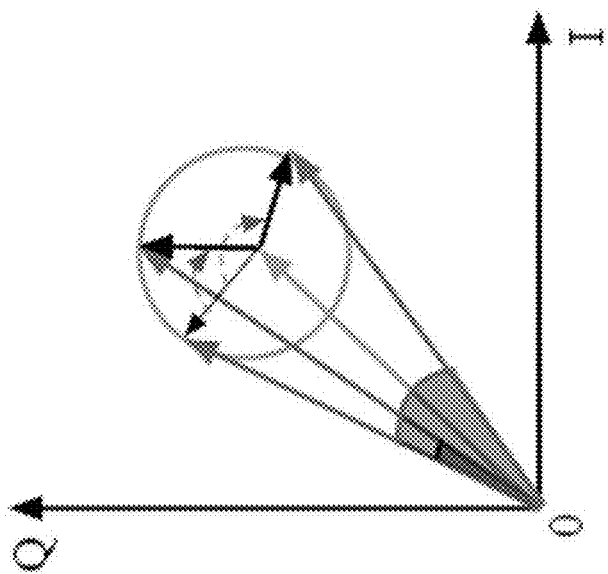
FIG. 5B illustrates that the phase variation of dynamic component can affect the phase variation of the composite signals, according to an example implementation of the present disclosure.
Figure 5A:
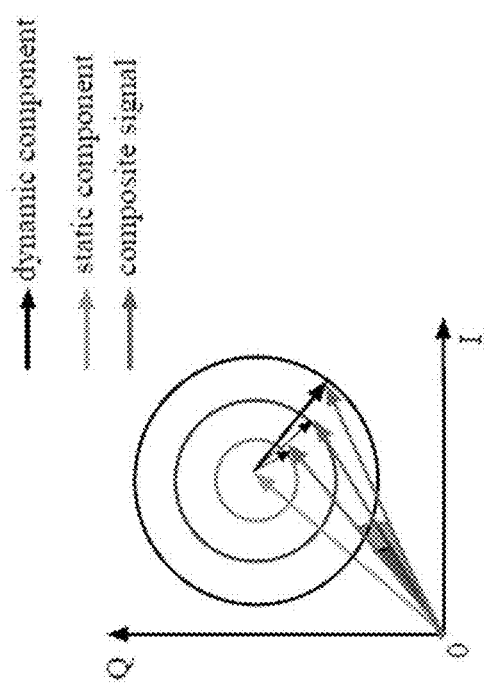
FIG. 5A illustrates that the amplitude variation of the dynamic component can affect the phase variation of the composite signals, according to an example implementation of the present disclosure.

FIGS. 5A-5D illustrate factors that can affect the phase variation of the composite signals received at the reader. FIG. 5A shows that the amplitude of the signals reflected off the road surface will affect the phase variation of the composite signals received at the reader. As the amplitude variation of the dynamic component becomes larger, the phase variation of the composite signals becomes larger. However, the amplitude of the signals reflected off the road surface depends on the material contents of the road surface and the distance between the reader's antenna and the road surface.

FIG. 5B illustrates that the phase variation of the dynamic component will affect the phase variation of the composite signals. As the phase variation of dynamic component becomes larger, the phase variation of the composite signals becomes larger.

Figure 5D:
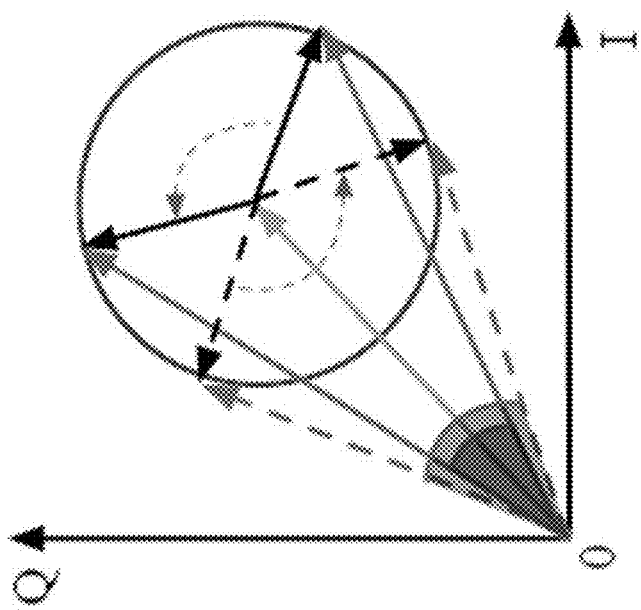
FIG. 5D illustrates that the location of the bump or pothole on the road surface can affect the phase variation of the composite signals, according to an example implementation of the present disclosure.
Figure 5C:
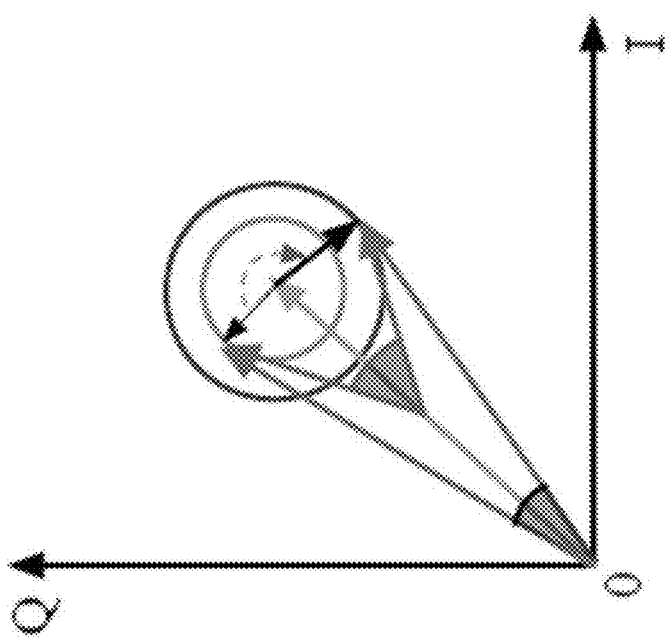
FIG. 5C illustrates that the amplitude of the static component can affect the phase variation of the composite signals, according to an example implementation of the present disclosure.

FIG. 5C illustrates that the amplitude of the static component can affect the phase variation of the composite signals. As the amplitude of the static component becomes smaller, the phase variation of composite signals becomes larger. However, it can be difficult to control above three factors to maximize the phase variation of the composite signals received at the reader [41].

Note, the location of bumps or potholes on the road surface will also affect the variation of composite signals as shown FIG. 5D. So, the example implementation can directly extract the reflections from the road surface to obtain the road surface information.

Instead of maximizing the phase variation of the composite signals by introducing another tag to harness the tag-tag coupling effect (e.g., TagSMM is designed for vibration sensing) for road surface sensing, the example implementation can extract the clean backscattered signals reflected off the road surface to sense the road surface conditions. This is because TagSMM can carefully deploy a non-target tag to harness the coupling effect between the target tag and non-target tag, which may not be reliable when both of the tags are attached at the front end of the vehicle due to the vibration of the vehicle's body. RF-EAR leverages the Orthogonal Matching Pursuit algorithm to characterize different vibration sources by scaling the different factors for different vibration sources, which is designed for vibration sensing. In Tago, the tag and reader's antenna are co-located on the front end of the vehicle (i.e., infrastructure-free), which is different from the existing infrastructure-based RFID sensing systems.

To obtain the clean reflections from the road surface, example implementations of the present disclosure can implement a backscattered signal cancellation approach to sense the road surface.

The tag can modulate the composite signal from the reader (i.e., signals transmitted from reader's transmit antenna) and the background reflectors (i.e., signals reflected off the different objects around the tag). The composite signal can be reflected off the tag through ON-OFF keying modulation. The reflections from the bump on the road surface can be included in the background reflections. The systems and methods of the example implementation can disentangle the road surface reflections from the background reflections. Optionally, the direct-link signals can be dominant due to Tago's settings.

Examples of modeling backscatter communication in LOS are described herein. FIG. 6A illustrates the case where there are no reflectors around a commodity passive RFID system (i.e., LOS setting). The reader can initialize the communication and activate the tags by sending the constant continuous wave (i.e., cw). After the tag is activated, it can cause backscattering the cw signals with ON-OFF keying modulation. The reader can send a request x (i.e., complex scalar value) to the tag within its communication range. The tag will backscatter the received signal through ON-OFF keying modulation. So, the reader can receive the backscattered signal as follows:

$$y_d = h_{Rr}h_{tr}h_T h_{rt}h_{Rt}zx + h_{Rr}h_{rr}h_{Rt}x \qquad (1)$$

where $h_{tr}$ denotes the wireless channel from tag to reader's receive antenna, and $h_{rr}$ denotes the channel from the reader's transmit antenna to receive antenna. $h_{rt}$ denotes the channel from reader's transmit antenna to tag. z denotes the data transmitted by tag. The study herein uses $h_{Rt}$, $h_{Rr}$ and $h_T$ to denote the hardware distortion at reader's transmit antenna, receive antenna and tag respectively. $h_{Rr}h_{rr}h_{Rt}x$ represents the self-interfered signals received at the reader's receive antenna. The impinged signals on the tag body are $h_{rr}h_{Rt}x$. Since the passive RFID tag simply backscatters the impinged signals from the reader, the example implementation can optionally consider h T once. Then, the backscattered signals received by the reader's receive antenna are $h_{Rr}h_{tr}h_T zh_{rr}h_{Rt}x$. Note that the RFID reader can be capable of self-interference cancellation to eliminate the signal leakage at reader. Therefore, the reader will receive the following signal:

$$y_d = h_{Rr}h_{tr}h_T h_{rt}h_{Rt}zx + h_{rr}h_{Rt}h_{Rr}x - h_{rr}h_{Rt}h_{Rr}x \qquad (2)$$

$$= h_{Rr}h_{tr}h_T h_{rt}h_{Rt}zx$$

Backscatter communication in NLOS. When there are other objects (e.g., vehicle's body or curb) around the commodity passive RFID system. The reader can receive the composite reflections from the tag and other objects as shown in FIG. 6B. Instead of modulating the signal from the reader, the tag can modulate the composite signal from the reader and other objects. So, the impinged signal on the tag is $h_{rt}h_{Rt}x + h_{rot}h_{Rt}x$, where $h_{rt}h_{Rt}x$ denotes the impinged signal from the reader and $h_{rot}h_{Rt}x$ denotes the impinged signal traversing over the other objects. The term h rot denotes the channel traversing over the other objects from the reader to tag. After the reader cancels out the self-interference signal, the reader will receive the following signal:

$$y_o = h_{Rr}h_{tr}h_T h_{rt}h_{Rt}zx + h_{Rr}h_{tr}h_T h_{rot}h_{Rt}zx. \qquad (3)$$

As shown in the above equation, the objective is to estimate the channel affected by the other objects (e.g., road surface). However, $h_{Rr}h_{tr}h_T h_{rt}h_{Rt}$ can dominate the received signal $y_o$, which can affect the road surface sensing.

The example implementation can cancel out the reflections from the other objects such as the vehicle's body to obtain the reflection from the road surface. FIG. 6C shows the signal paths between the reader and tag, for a vehicle driving on a road. The term v denotes the reflection from the road surface. So, the tag can modulate the impinged signal $h_{rt}h_{Rt}x+h_{ro}h_{Rt}x+h_{rv}h_{Rt}x$ with ON-OFF keying modulation, where $h_{rv}h_{Rt}x$ denotes the signal traversing over the road surface. The term $h_{rvt}$ denotes the channel traversing over the road surface from the reader to the tag. After self-interference cancellation, the reader can receive the signal as follows:

$$y_v = h_{Rr}h_{tr}h_T h_{rt} h_{Rt} zx + h_{Rr}h_{tr}h_T h_{ro} h_{Rt} zx + h_{Rr}h_{tr}h_T h_{ro} \cdot h_{Rt} zx \quad (4)$$

Figure 8:
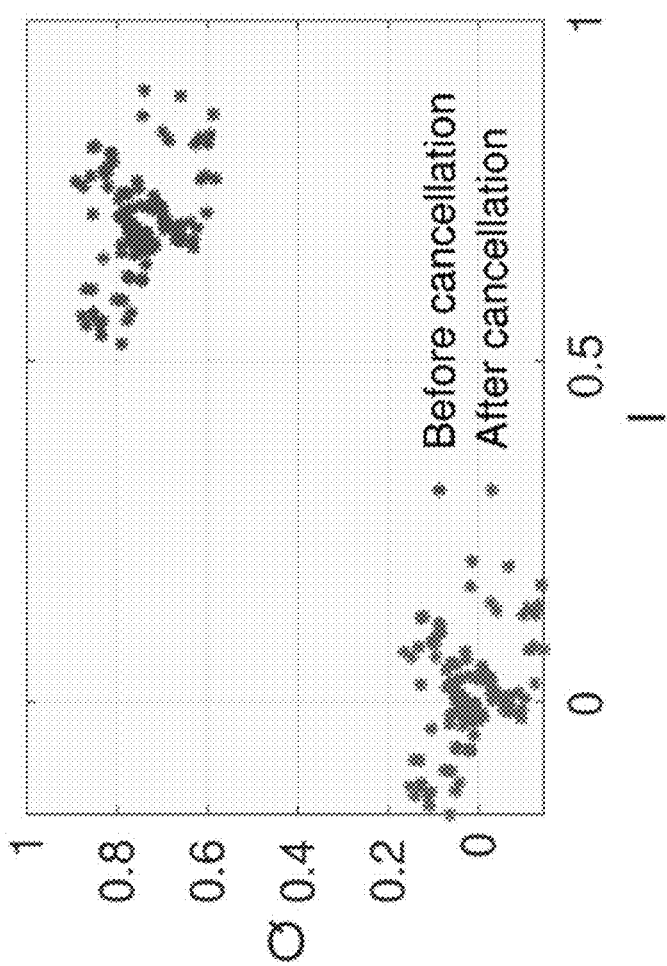
FIG. 8 illustrates an example of backscattered channel in IQ domain before and after dominant signal cancellation, according to an example implementation of the present disclosure.

The backscattered signals received at the reader can include two components: the direct reflection and multi-path reflection. For the multi-path reflections from tag to reader, reflected signals from tag come from two sources: directly impinged signals from reader and the other objects' reflections, which will be used by the tag to modulate its own data. For the tag's reflected signals directly coming from the reader, when they are backscattered by the tag over other objects, they are also included in the second component of right side of Eq. (4) due to the reciprocity of dominant and over-the-air wireless channel. For the tag's reflected signals coming from the other objects' reflections, when they are backscattered by the tag over other objects, they become weaker due to multiple attenuation. So, in Eq. (4), the example implementation can count the reflections over the other objects once. FIG. 8 shows the ICI constellation of the backscattered channel before and after signal subtraction.

As shown in FIG. 8, after the signal subtraction, the channel samples are distributed around origin point. This is because the example implementation can cancel out the dominant contribution from the composite backscattered channel. This indicates that the system can ignore the reflections traversing over objects multiple times and the impact of RFIC's impedance due to their weak impact. FIG. 9 illustrates an example algorithm for performing road surface sensing with signal cancellation.

To extract the reflections from the road surface, the system can perform subtraction as follows:

$$y'_v = y_v - y_o = h_{Rr}h_{tr}h_T h_{rvt} h_{Rt} x \quad (5)$$

where $h_v = h_{Rr}h_{tr}h_T h_{rvt}h_{Rt}$ will be extracted through the backscattered channel estimation. Since the tag and reader's antenna can be deployed at the front end of the vehicle, the reflections from the vehicle's body can be quite stable. So, the system can perform the above subtraction, especially in the outdoor environment. Note that the above subtraction can also cancel out the effect of engine's vibration. Since the system's objective can be to obtain the channel $h_{rvt}$, the system can further eliminate the impact of hardware distortion and the line-of-sight propagation between the reader and tag. The line-of-sight propagation channel between the reader and tag can be modeled as follows:

$$h_{rt} = h_{tr} = \frac{1}{d_{rt}^2} e^{-j2\pi \frac{d_{rt}}{\lambda} \bmod 2\pi} \quad (6)$$

where $d_{rt}$ denotes the distance between the reader and tag. The example implementation can set $h_{rt} = h_{tr}$ due to the geometric symmetry. $h_{rt}$ and $h_{tr}$ can be calculated with known distance $d_{rt}$ between the reader and tag. Next, the system can compensate the hardware distortion, which can be calibrated once and used for the rest of life [43]. The expected channel $h_{rvt}$ reflected off the road surface can be obtained by:

$$h_{rvt} = \frac{h_v}{H' \frac{1}{d_{rt}^2} e^{-j2\pi \frac{d_{rt}}{\lambda} \bmod 2\pi}}, \quad (7)$$

where $H' = h_{Rr}h_T h_{Rt}$ denotes the calibrated hardware distortion of the reader and tag. Road surface sensing with signal cancellation algorithm. The Algorithm 1 shown in FIG. 9 can extract the reflection from the road surface. The steps of an example algorithm for extracting the reflection from the road surface include:

Distortion mitigation: The system can estimate the impact of hardware distortion and line-of-sight propagation channel between the reader and tag in line-of-sight setting. After pre-calibration, the system can obtain H' and equation (6).

Backscattered signal extraction: The commodity passive RFID system can be deployed at the front end of the vehicle to sense the road surface conditions. (e.g., to obtain the received signal at the reader shown in equation (3)).

Real-time backscattered signal cancellation: As the vehicle drives the system can collect the received signal at the reader shown in equation (4). Subtraction in equation (5), can be obtained through subtraction of the consequent and window-sized backscattered signals. Then, the system can estimate the channel traversing over the road surface from the reader to the tag as shown in equation (7). By doing this, the impact of vehicle's body vibration and the other external reflectors (e.g., curb) could be mitigated, showing a peak/trough indicating the bump/pothole in the phase profile.

Figure 10:
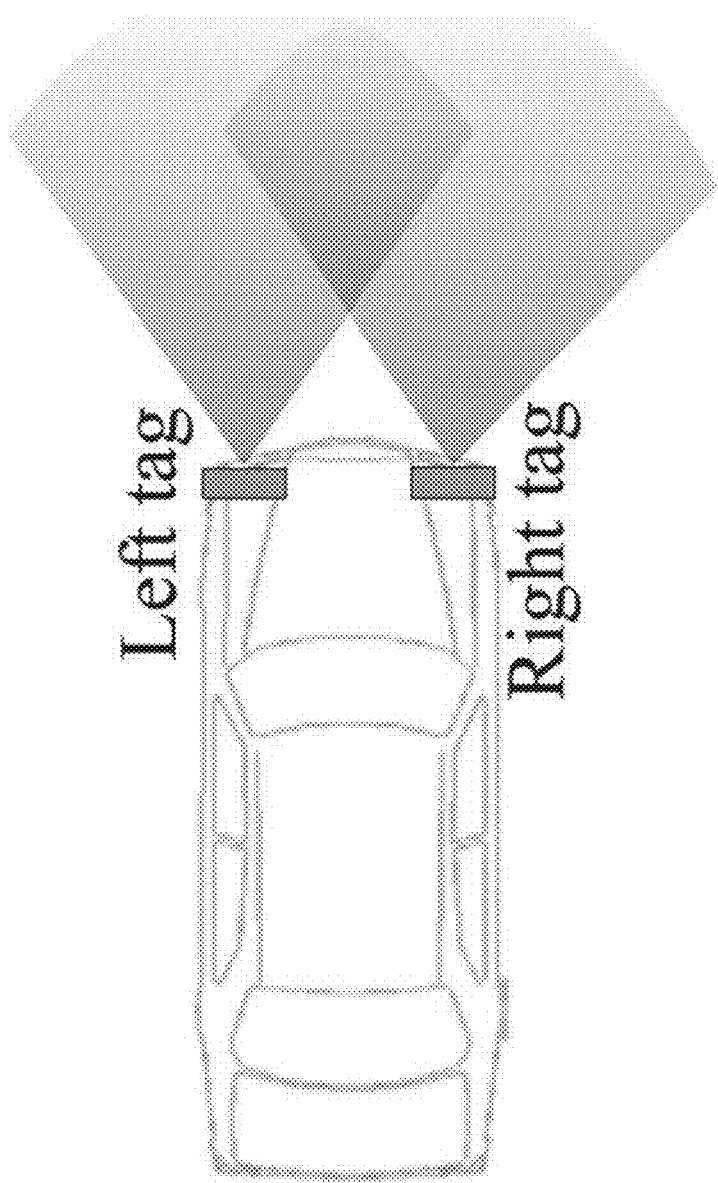
FIG. 10 illustrates an example of two tags placed on the front of a vehicle for sensing a road surface, according to some implementations of the present disclosure.

Since the commodity passive RFID system is orientation-sensitive and the bumps are randomly distributed on the road surface, it can be important to detect these bumps with multiple tags attached to the vehicle for reliable sensing. Considering the beamwidth of the reader's directional antenna (i.e., 105° [4]) and the width of the vehicle and road, the example implementation can just attach two tags at the front of the vehicle as shown in FIG. 10. Each tag can be responsible to sense half side of the road surface, which can be visualized as analogous to the two headlights of the vehicle.

Figure 11:
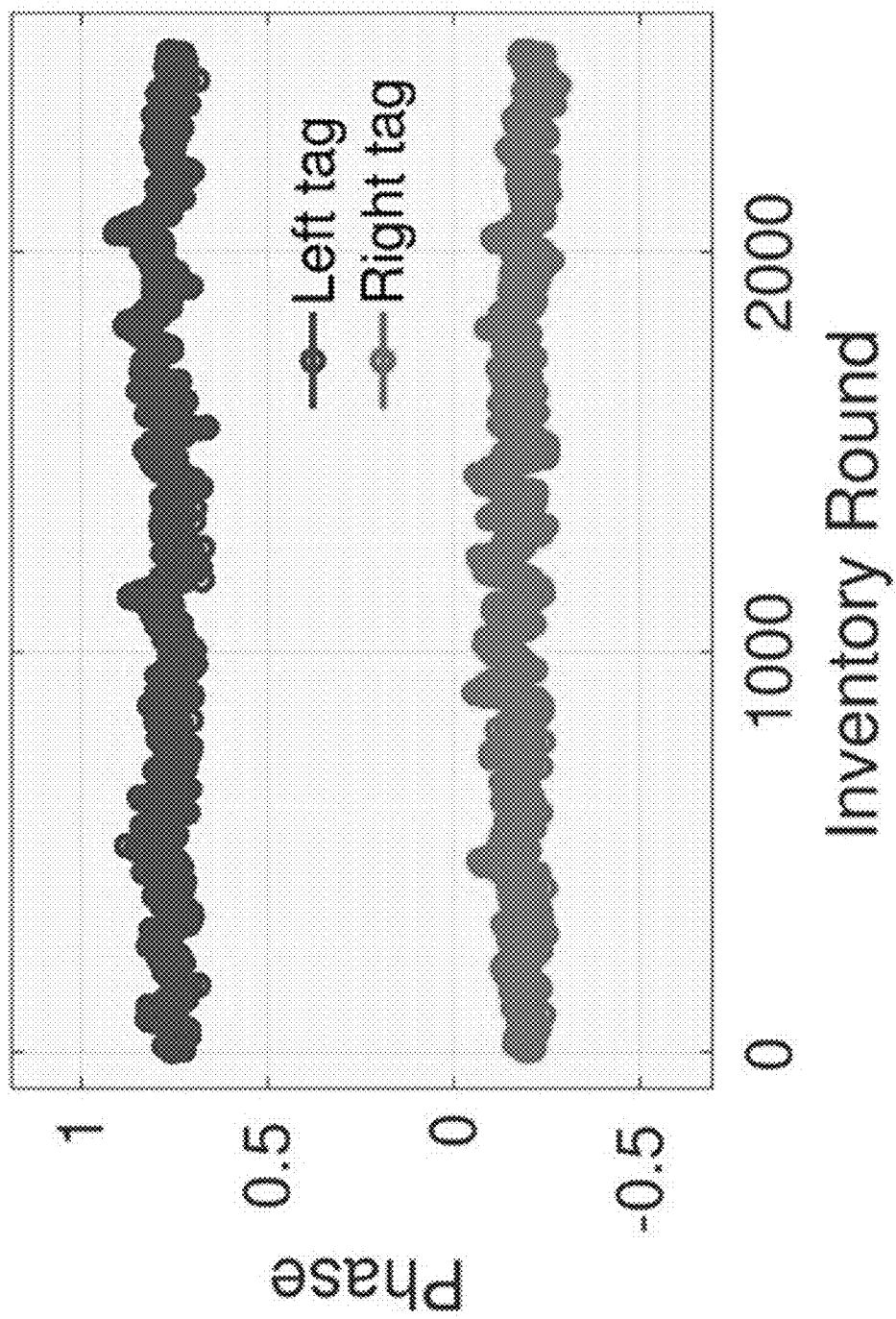
FIG. 11 illustrates left tag and right tag phase readings, showing that two tags can exhibit different phase readings over time, according to an example implementation of the present disclosure.

FIG. 11 shows the phase readings over time from two tags. Two tags can present different phase readings, since the road surface conditions are different. More tags can optionally be deployed at the front of the vehicle to achieve reliable and fine-grained road surface sensing. However, the low tag reading rate due to the collisions can degrade the RFID's sensing ability.

The present disclosure can include a controller that can perform data processing steps and control the RFID system. The example described herein includes non-limiting examples of hardware and software that were used in the example implementation.

Hardware. Tago can include commodity passive RFID tags and USRP N210 as reader, which is FCC-compliant working at the frequency band of 902-928 MHz. The example implementation can extract phase and amplitude of the backscattered signal from the reader. FIG. 12 illustrates Tago's hardware components. The circular polarized antennas [4] are connected to the reader, which has antenna gain of 11 dBi and beamwidth of 105°. As another non-limiting example, the system can use different commodity passive RFID tags from atlasRFID store [6] (e.g., ALN-9662, Monza 4D and R6-P [7]) attaching to the front end of the vehicle during the experiments, which are widely used with reading range of 5-15 meters at best [37]. The USRP reader can interrogate the tags and receive the backscattered signals from tags to extract phase and amplitude readings, via the Ethernet cable connecting with a host PC.

Software. The reader's implementation can enable the RFID communication using USRP N210 as reader. The road surface sensing algorithms are implemented offline with MATLAB for signal processing. The commodity passive RFID system complies with C1G2 standard using slotted ALOHA protocol to interrogate tags. There are two main steps during tag interrogation. At the first step, the activated tags will reply RN16 to the reader for channel access permission (i.e., query step). During query step, the reader will initialize some parameters such as M (i.e., the number of frames/inventory rounds), $Q(2^Q$ indicates the number of time slots in one frame/inventory round), four sessions (i.e., used for multi-reader reading), flags (e.g., SL flag and inventoried flag) and so on. In the example implementation, optionally Q=0 is set, meaning there is one time slot in each frame, for an example implementation with only one tag. This can maximize the tag reading rate (the tag reading rate can measure how often the system can obtain the channel information in RFID communication). The value of M depends on how long the vehicle is driven (optionally set to 5000 by default). The other parameters are set as default value (e.g., zero). At the second step, the reader will chose one tag to communicate and the chosen tag will reply EPC to the reader. The channel information extraction happens in the second step with preamble based channel estimation. The reader will report the phase angle through channel sounding using EPC packets.

Compared approach. The performance of Tago was compared to smartphone-based road surface sensing. The example uses an iphone 7 to measure the data readings from the gyroscope of the smartphone. The smartphone can be deployed and fixed at the different positions inside of the vehicle (e.g., windshield, air-conditioning vents, etc.) as shown in FIG. 12.

During the experiments described herein, different vehicles (e.g., Honda Civic and Honda CRV Warner shown in FIG. 7B) can be used. The experiment can include driving the vehicle on the different road conditions (e.g., bumpy and smooth road) with different speed (e.g. 10 mph, 15 mph and 20 mph). The study drove the vehicle in urban (FIG. 29) and residential area (FIG. 31) for road surface sensing.

The different road surface conditions can reflect the backscattered signals differently.

To see the effectiveness of an example implementation of the present disclosure at sensing smooth and bumpy road, the study drove the vehicle on the smooth and bumpy road respectively with different driving speed. Moreover, the study compares the phase readings, when vehicle is moving and static. To do so, the study drove the vehicle for a period of time and stop the vehicle to see the variation of phase readings.

Figure 13:
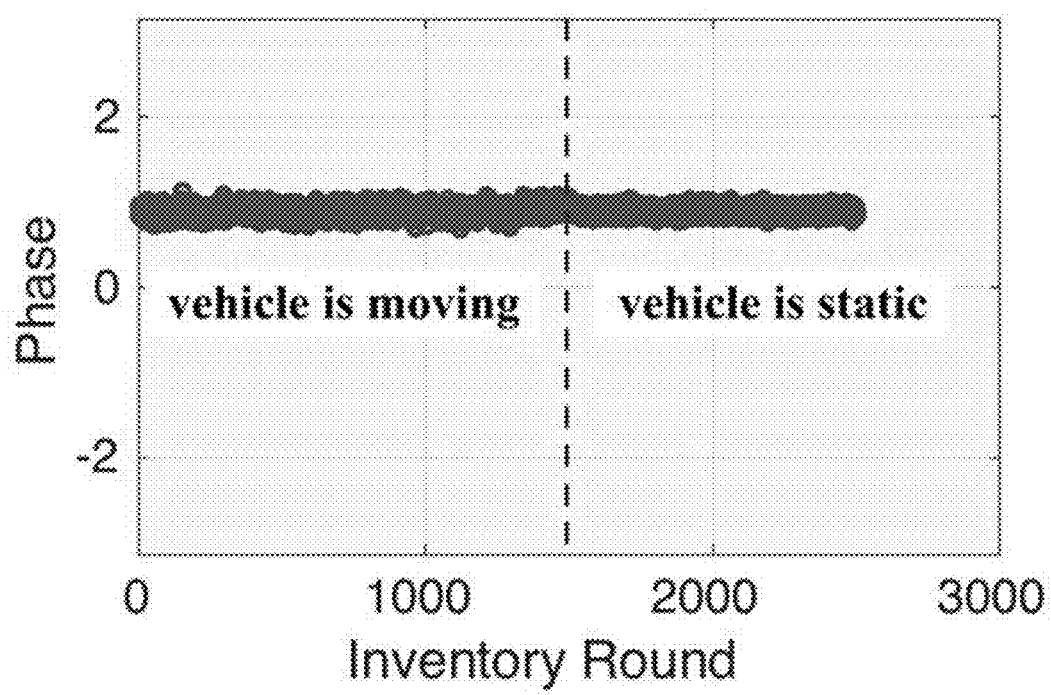
FIG. 13 illustrates phase readings over time, when driving a vehicle on the smooth road with speed of 10 mph, according to an experimental implementation of the present disclosure.
Figure 14:
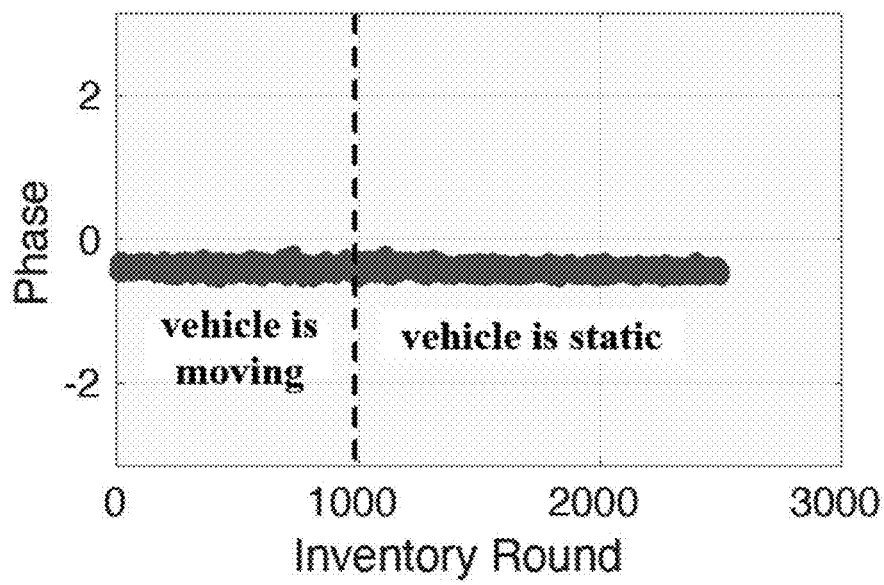
FIG. 14 illustrates phase readings over time, when driving a vehicle on the smooth road with speed of 20 mph, according to an experimental implementation of the present disclosure.
Figure 15:
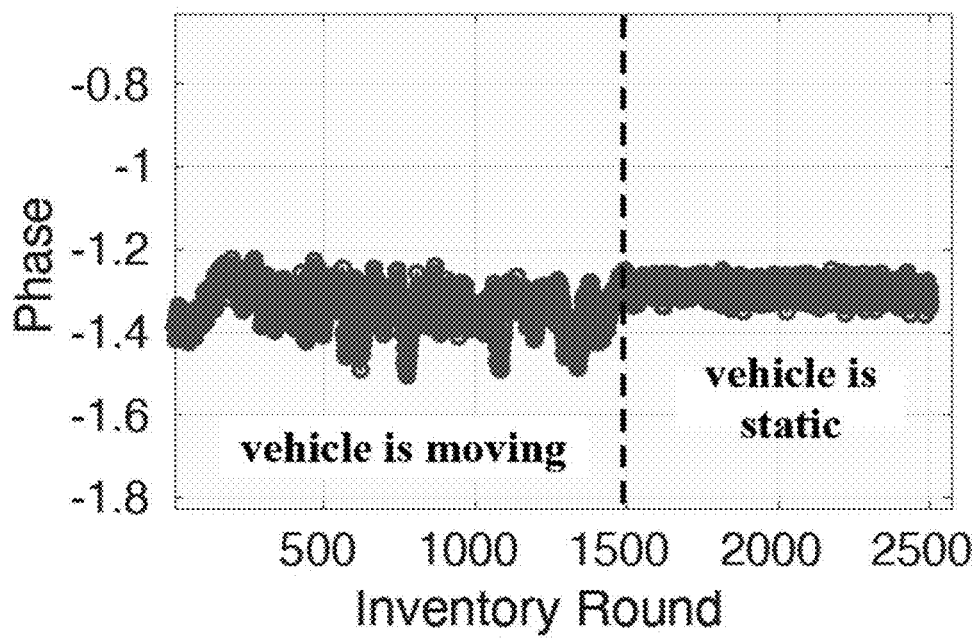
FIG. 15 illustrates phase readings over time, when driving a vehicle on the bumpy road with speed of 10 mph, according to an experimental implementation of the present disclosure.
Figure 16:
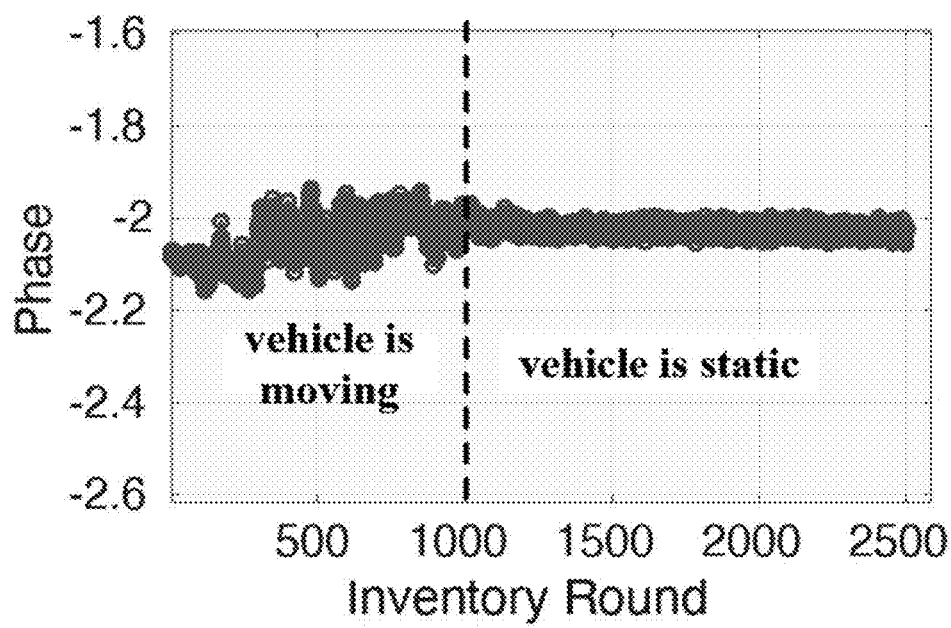
FIG. 16 illustrates phase readings over time, when driving the vehicle on a bumpy road with speed of 20 mph, according to an experimental implementation of the present disclosure.
Figure 17:
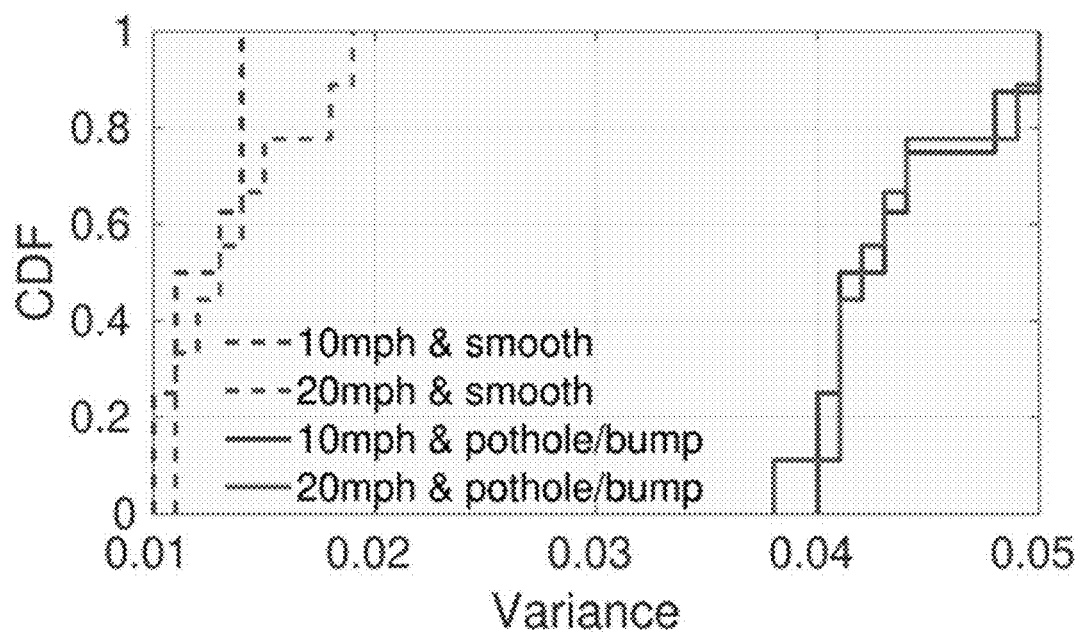
FIG. 17 illustrates a plot of CDF of phase variance when driving on the smooth and bumpy road with different speeds, according to an experimental implementation of the present disclosure.

FIG. 13 and FIG. 14 show the phase readings over time, when the study tested the vehicle on the smooth road with speed of 10 mph (FIG. 13) and 20 mph (FIG. 14) and stopped during driving. The phase variation is stable over the time after the study stopped the vehicle (i.e., the vehicle is static). FIG. 15 and FIG. 16 show the phase readings over time, when the vehicle is driven on a bumpy road with speed of 10 mph (FIG. 15) and 20 mph (FIG. 16) and stopped during driving. The phase variation is significant, when the vehicle is driven on the bumpy road. When the vehicle is stopped, the phase readings become stable. This is because the road surface conditions can affect the backscattered signals, such that the variation of backscattered signals can be used to sense the bumpy and smooth road surface. FIG. 17 shows the CDF of the phase variance, when the study drove the vehicle on smooth and bumpy road with different speed. The phase variance can be consistent, when the vehicle is driven with different speed on the same road surface. When the vehicle is driven on a bumpy road, the phase variance becomes larger in comparison to the phase variance when the study drove the vehicle on smooth road. This shows Tago can sense the road surface conditions with contact-free commodity passive RFID sensing system.

The study also evaluated the impact of the vehicle's vibration, passing-by passengers and other vehicles. The backscattered signals are reflected off the different objects around the vehicle such as the vehicle's body, passing-by pedestrians and vehicles.

To measure the impact of passing-by passengers and other vehicles, the study drove the vehicle on the smooth road at urban area, which can mitigate the impact of road surface condition on the backscattered signals. During the experiments, there are pedestrians walking on the sidewalk and the other vehicles passing by the example vehicle. The results show the phase and amplitude readings over time (i.e., inventory rounds), when the vehicle drives, and when the vehicle is static respectively.

Figure 18:
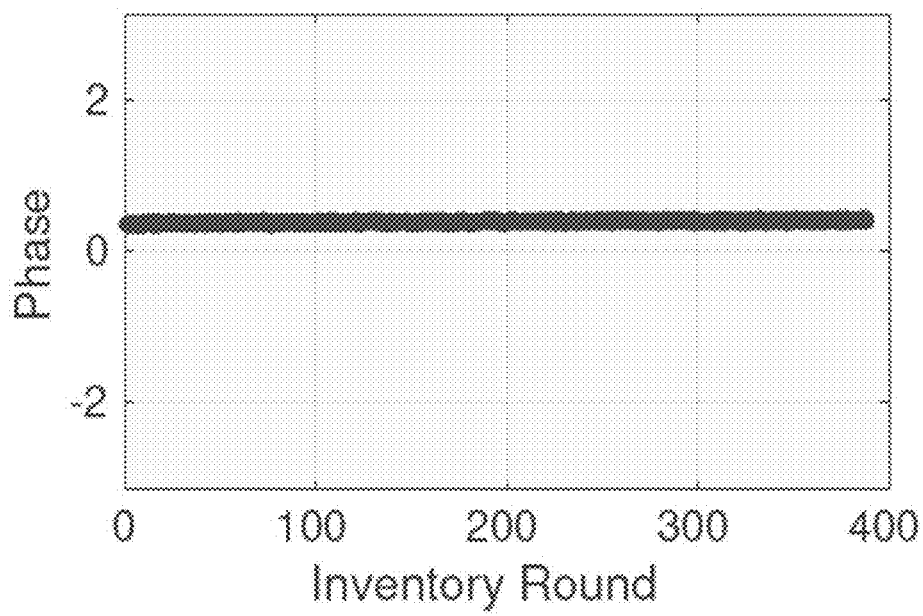
FIG. 18 illustrates phase readings over time, when the vehicle is static and the engine is on, according to an experimental implementation of the present disclosure.
Figure 19:
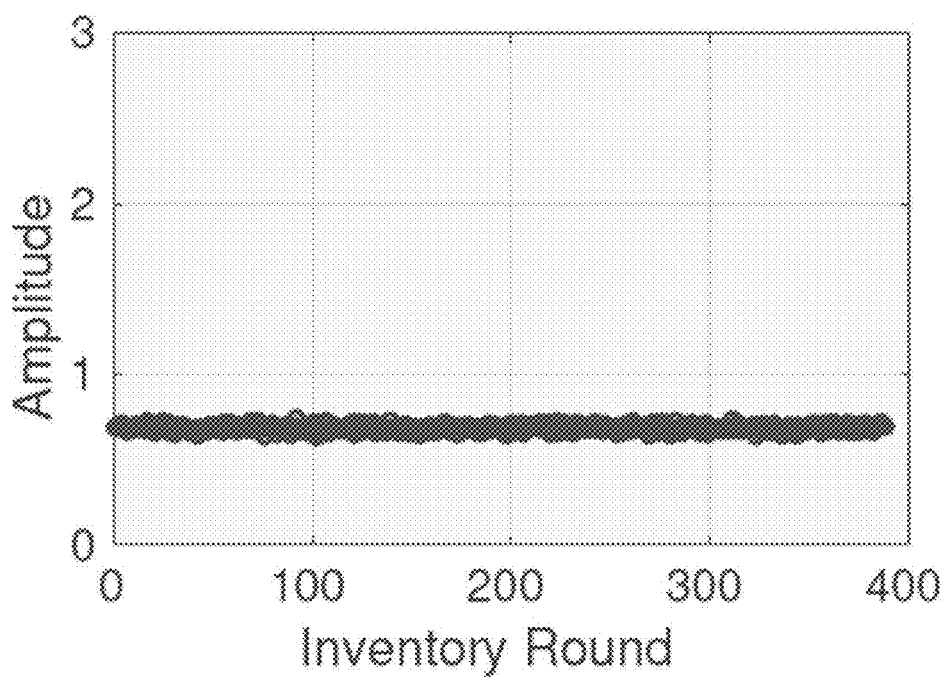
FIG. 19 illustrates amplitude readings over time, when the vehicle is static and the engine is on, according to an experimental implementation of the present disclosure.
Figure 20:
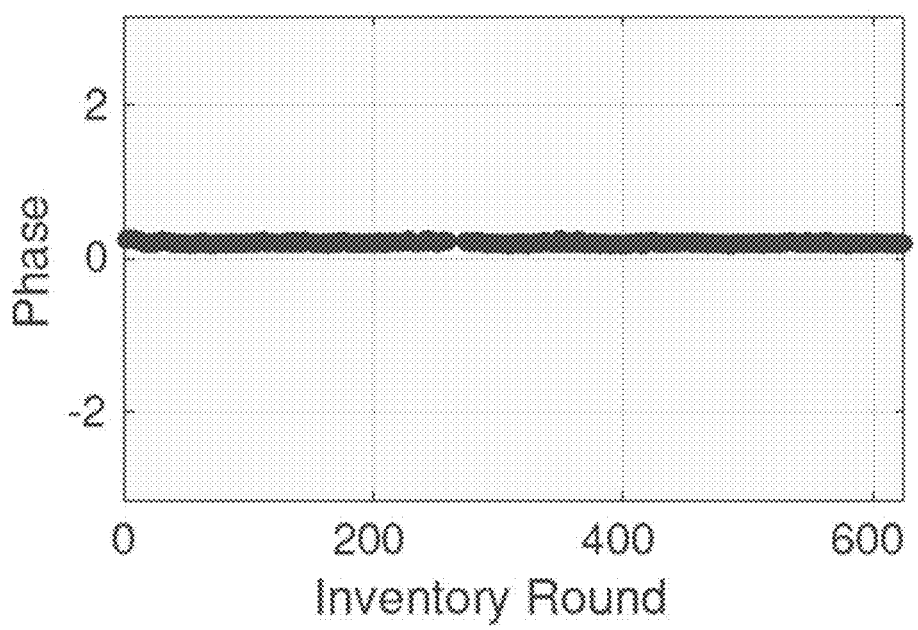
FIG. 20 illustrates phase readings over time, when the vehicle is driven a smooth road in an urban area, according to an experimental implementation of the present disclosure.
Figure 21:
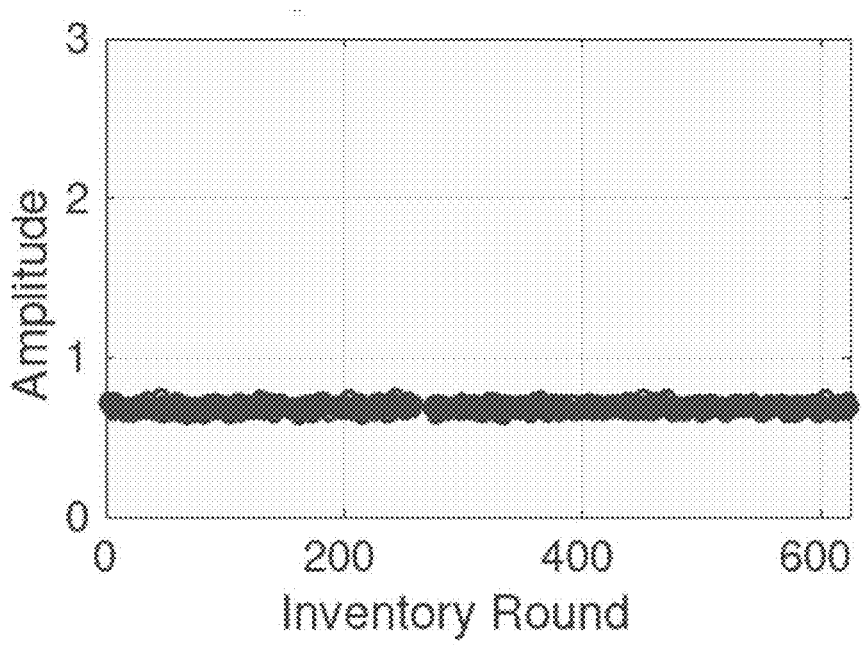
FIG. 21 illustrates amplitude readings over time, the vehicle is driven on the smooth road in an urban area, according to an experimental implementation of the present disclosure.

FIG. 18 shows the phase readings and FIG. 19 shows the amplitude readings over inventory rounds, when the vehicle is static and its engine is on. The study shows stable phase and amplitude readings. The vibration of vehicle's engine does not affect backscattered signals. This is because Algorithm 1 was applied and accounted for the vibration of the vehicle's body. Then, the study drove the vehicle on the smooth road to measure the impact of passing-by passengers and other vehicles. FIG. 20 shows the phase readings and FIG. 21 shows the amplitude readings over inventory rounds, when the study drove the vehicle on the smooth road at urban area. The phase and amplitude readings are quite stable, indicating that the pedestrians and other vehicles will not affect the backscattered signals. This is because the commodity passive RFID system can use the directional antenna with narrow beamwidth, which will only concentrate the signals in the front of the vehicle. The pedestrians and other vehicles can be positioned so that they are not in the reader's field-of-view, such that they cannot affect the backscattered signals.

The study also evaluated the impact of pothole size. Pothole on the road surface can be a variety of different sizes. Intuitively, the bigger pothole may be easier to detect than smaller potholes.

Figure 22A:
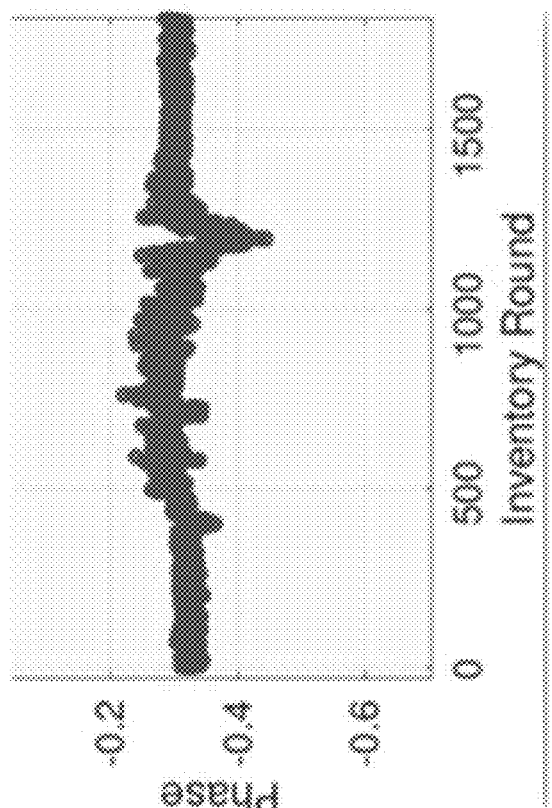
FIG. 22A illustrates phase readings over time, when a vehicle passes a big pothole with size of 85×85×4 cm, according to an experimental implementation of the present disclosure.
Figure 22B:
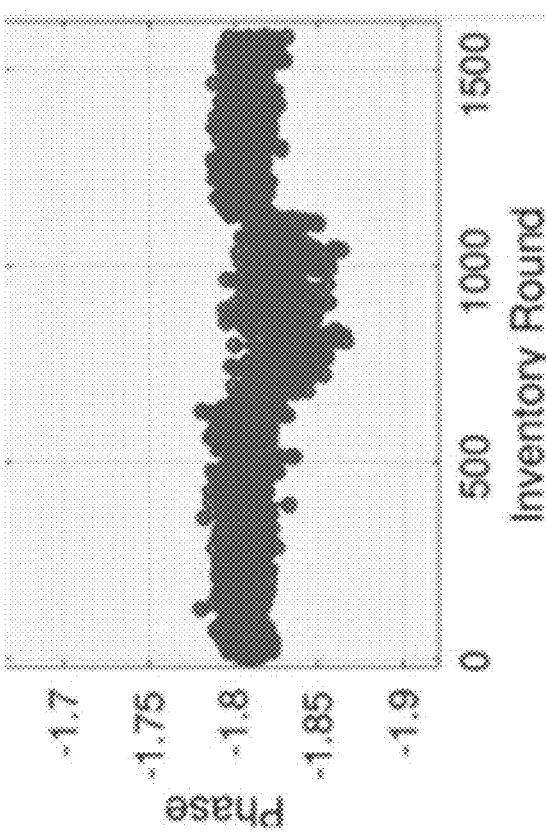
FIG. 22B illustrates phase readings over time, when a vehicle passes a small pothole with size of 28×28×3.5 cm, according to an experimental implementation of the present disclosure.

To see the impact of pothole size on road surface sensing, the study drove the vehicle with speed of 10 mph passing by the big pothole (e.g., with size of 85×85×4 cm) and small pothole (e.g., with size of 28×28×3.5 cm) on the road surface. FIG. 22A shows the phase readings from the tag, when the study drove the vehicle over the big pothole and FIG. 22B shows the phase readings from the tag when driving over the small pothole. The large pothole can cause a larger trough in the phase reading profile as shown in FIG. 22A. The small pothole can cause a sharp trough in the phase reading profile as shown in FIG. 22B. These results indicate that the size of pothole will affect Tago's road surface sensing. Potentially the example implementation can leverage the phase readings to create the profile of the pothole and bump on the road surface. However, since the tags are attached at the front end of the vehicle, they can be limited to one dimensional information of the pothole or bump (e.g., width). Three-dimensional profiling the pothole or bump on the road surface (e.g., the length, height and width of the bump or pothole) can be performed using additional tags and/or readers.

The commodity passive RFID system can employ the directional antenna to concentrate RF signals for long-range RFID communication. And, the potholes or bumps can be randomly distributed on the road surface. To reliably sense the road surface conditions and detect the potholes or bumps on the road surface, The example implementation can attach two tags at the left and right front end of the vehicle like the vehicle's headlights. The study first drove the vehicle attached with two tags to pass the pothole on the left side of the road surface. Then, the study drove the vehicle attached with two tags to pass the pothole on the right side of the road surface.

Figure 23:
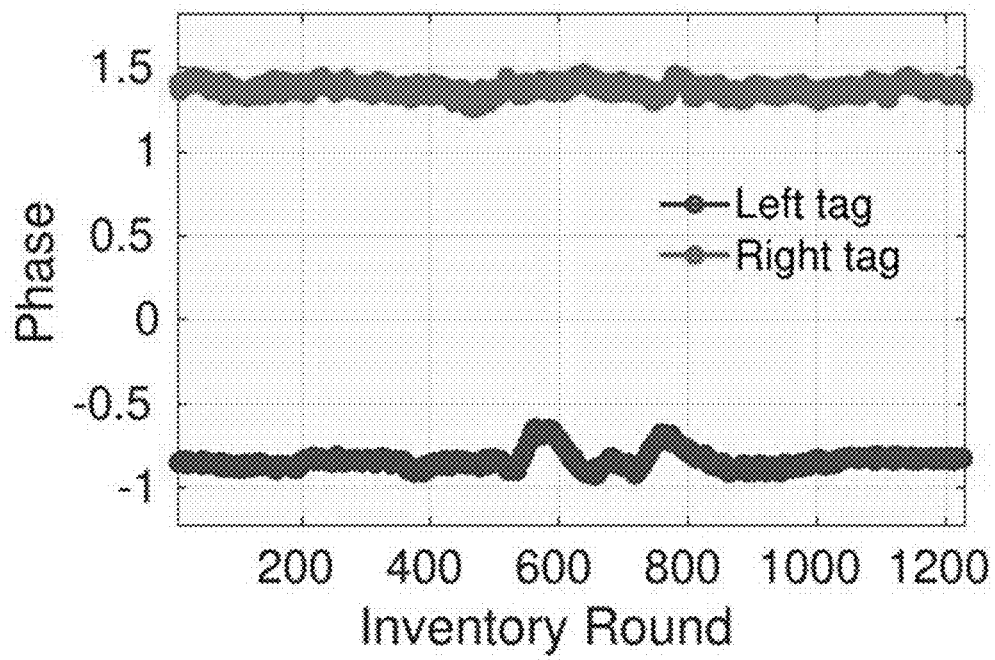
FIG. 23 illustrates phase readings over time when a vehicle passes over a pothole located at the left side of the road is detected by the left tag attached on the vehicle, according to an experimental implementation of the present disclosure.
Figure 24:
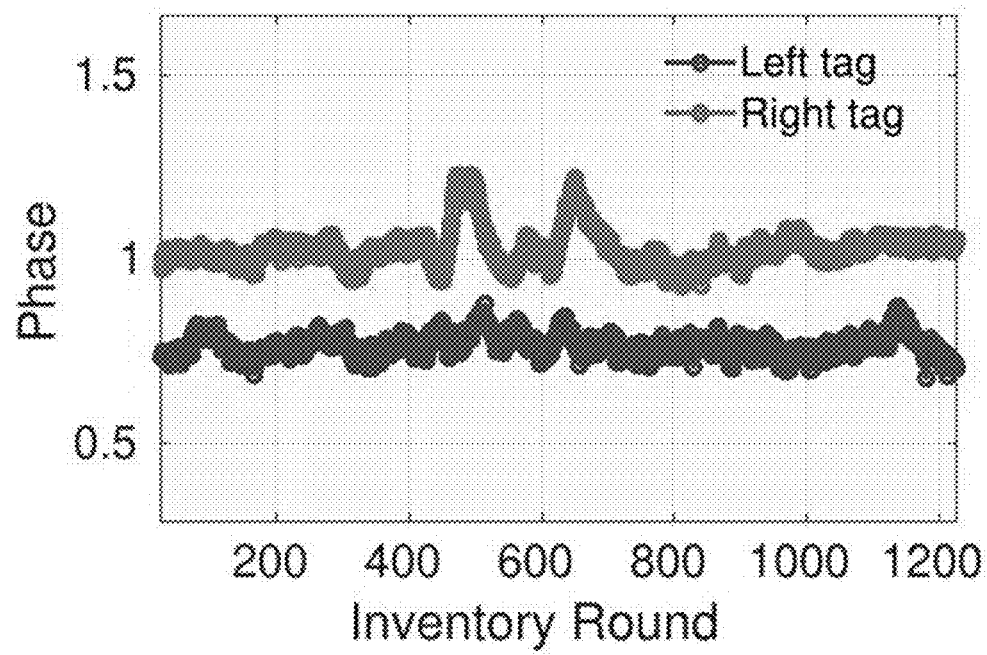
FIG. 24 illustrates phase readings over time when a vehicle passes over a pothole located at the right side of the road is detected by the right tag attached onto the vehicle, according to an experimental implementation of the present disclosure.

FIG. 23 and FIG. 24 show the phase readings of backscattered signals from two tags, when the study drove the vehicle passing the pothole located at the left or right side of the road surface. FIG. 23 shows a plot of the phase readings when the pothole is on the left side of the road surface and FIG. 24 shows a plot of the phase readings when the pothole is on the right side of the road surface. The phase variation of left tag is significant when the pothole is located at the left side of the road surface. The phase variation of right tag is significant when the pothole is located at the right side of the road surface. Since the commodity passive RFID system is orientation-sensitive, only one tag can sense the pothole located at the left or right side of the road surface. This potentially indicates that the passing-by passengers and other vehicles will not affect the backscattered signals due to the orientation sensitivity of RFID tags. In some implementations of the present disclosure, more than two tags can be deployed at the front end of the vehicle to enhance the sensing ability of Tago for road surface sensing.

The study further included a comparison to smartphone-based road surface sensing. The principle of smartphone-based road surface sensing relies on the MEMS gyroscope or accelerometer to detect the vehicle's body vibration caused by the bump or pothole on the road surface. Therefore, the smartphone-based road surface sensing system requires the vehicle's front tires to hit the bumps or potholes on the road surface to accurately detect them, which is actually violating the goal of safe driving.

The example passive RFID system described herein can provide the contact-free road surface sensing by deploying the reader's antenna and tag at the front end of the vehicle. As shown in FIG. 12 the example implementation can deploy reader's antenna and RFID tag at the front of the vehicle for contact-free road surface sensing. There can be a smartphone fixed at the arbitrary location inside of the vehicle (e.g., windshield). The vehicle setup used during the experiments is illustrated in FIG. 12. But, in an example study, the vehicle can be stopped before the vehicle's front tires touch the bump. By doing this, the tensing data read from the smartphone will not be affected by the bumps, since the vehicle's body does not vibrate. However, the backscattered signals from RFID tags attached at the front end of the vehicle can be affected.

Figure 25:
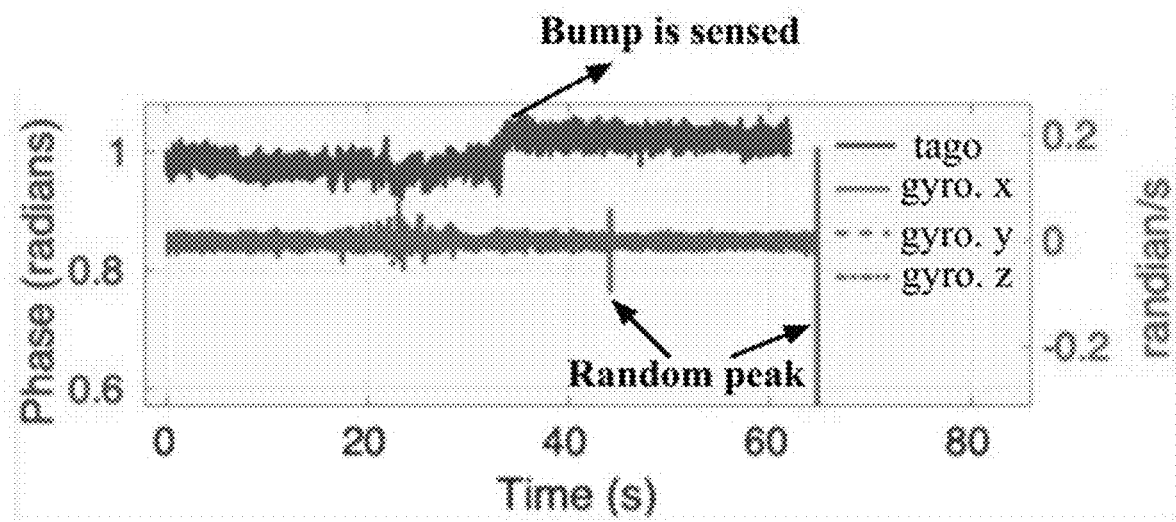
FIG. 25 illustrates phase readings of backscattered signal for the RFID-based contact-free road surface sensing and the rate of rotation measurements from gyroscope for smartphone-based contact road surface sensing, according to an experimental implementation of the present disclosure.

FIG. 25 shows the phase readings from the RFID tag and the rate of rotation measurements from gyroscope embedded in the smartphone. The phase readings are abruptly changed at 35 seconds. However, the rate of rotation measurements from the gyroscope keeps stable over time during the experiments. Therefore, the smartphone-based road surface sensing requires a vehicle's body vibration caused by the bumps or potholes on the road surface, which cannot achieve safe driving. However, the commodity passive RFID system can achieve contact-free sensing, which does not require the vehicle's tires to touch the bumps or potholes due to the fact of RF signals propagation. In comparison to the smartphone-based road surface sensing, Tago indeed achieves safe driving. Therefore, the commodity passive RFID system can be a good choice to achieve road surface sensing for safe and economic driving due to its low-cost (considering the smartphone can be the reader [5,8]), small form-factor and contact-free sensing.

The study measured the phase readings from the tag and the data from the gyroscope of the smartphone, when the study drove the vehicle in different speed. The study measured how far away the example implementation of Tago can sense the bump on the road surface in comparison to using the smartphone.

Figure 26:
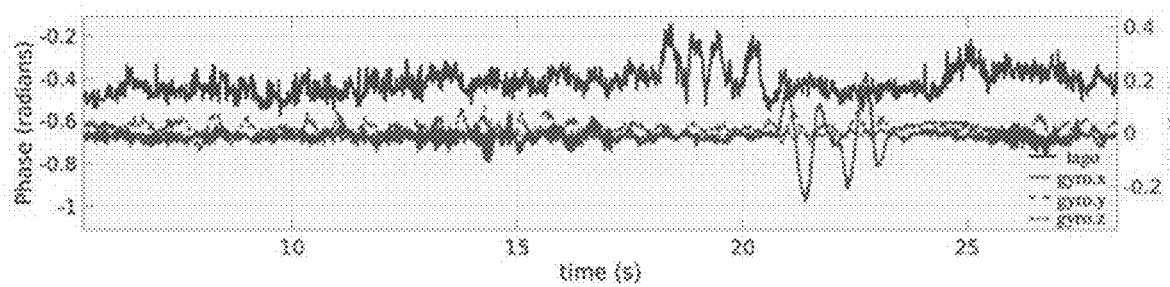
FIG. 26 illustrates phase readings from the tag and gyroscope data from the smartphone, when the study drove the vehicle in the speed of 10 mph passing the bump on the road surface, according to an experimental implementation of the present disclosure.
Figure 27:
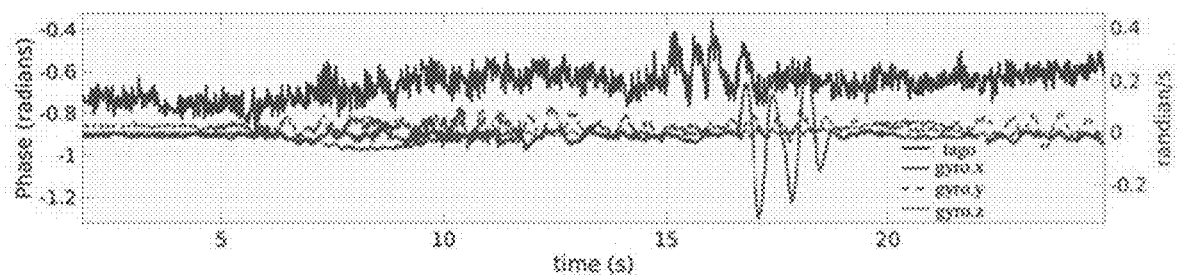
FIG. 27 illustrates phase readings from the tag and gyroscope data from the smartphone, when the study drove drive the vehicle at the speed of 15 mph passing the bump on the road surface, according to an experimental implementation of the present disclosure.
Figure 28:
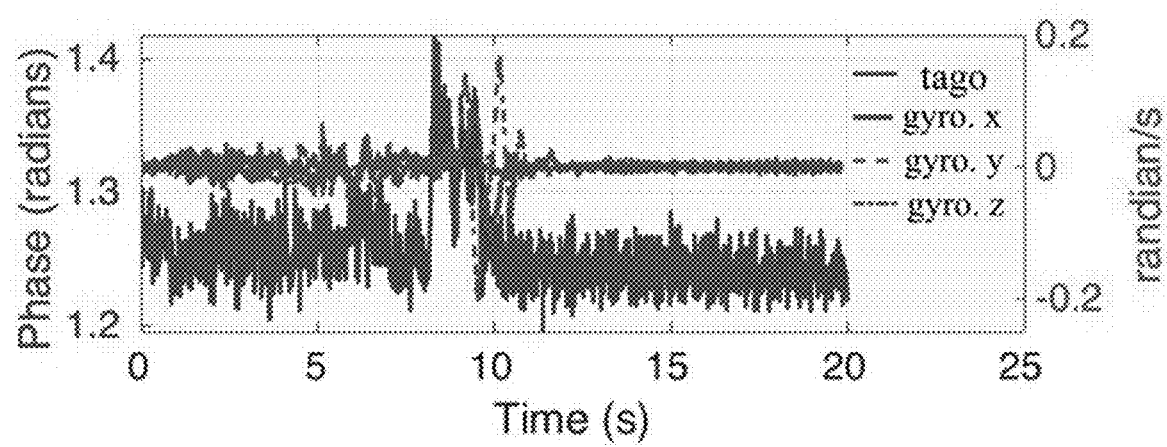
FIG. 28 illustrates phase readings from the tag and gyroscope data from the smartphone, when the study drove the vehicle at 20 mph passing a bump on the road surface, according to an experimental implementation of the present disclosure.

FIG. 26 shows phase readings from tag and gyroscope data from smartphone, when the study drove the vehicle in the speed of 10 mph passing the bump on the road surface. Tago can sense the bump on the road surface about 2.2 seconds earlier than using the smartphone to sense the bump. Therefore, Tago can sense the bump on the road surface in contact-free way, which can allow about 2.2 seconds for the vehicular system to react to the hazardous road conditions. FIG. 27 shows the phase readings from tag and gyroscope data from smartphone, when the study drove the vehicle in the speed of 15 mph passing the bump on the road surface. The study shows that Tago can sense the road surface about 1.6 seconds earlier than using the smartphone to sense the bump. So, the vehicular system has about 1.6 seconds to react to the hazardous road conditions. FIG. 28 shows the phase readings from tag and gyroscope data from smartphone, when the study drove the vehicle in the speed of 20 mph passing the bump on the road surface. Tago can sense the road surface about 1.0 seconds earlier than using the smartphone to sense the bump. So, the vehicular system has about 1.0 second to react to the hazardous road conditions. The above results indicate that Tago can achieve the goal of safe driving due to its contact-free sensing.

The study measured the accuracy of sensing the bumps on the road surface using Tago, when driving the vehicle on the roadways at the urban and residential area respectively. To see the performance of Tago on roadways, the study drove the vehicle in an example residential community and urban area. There are several bumps on the road surface.

Figure 29:
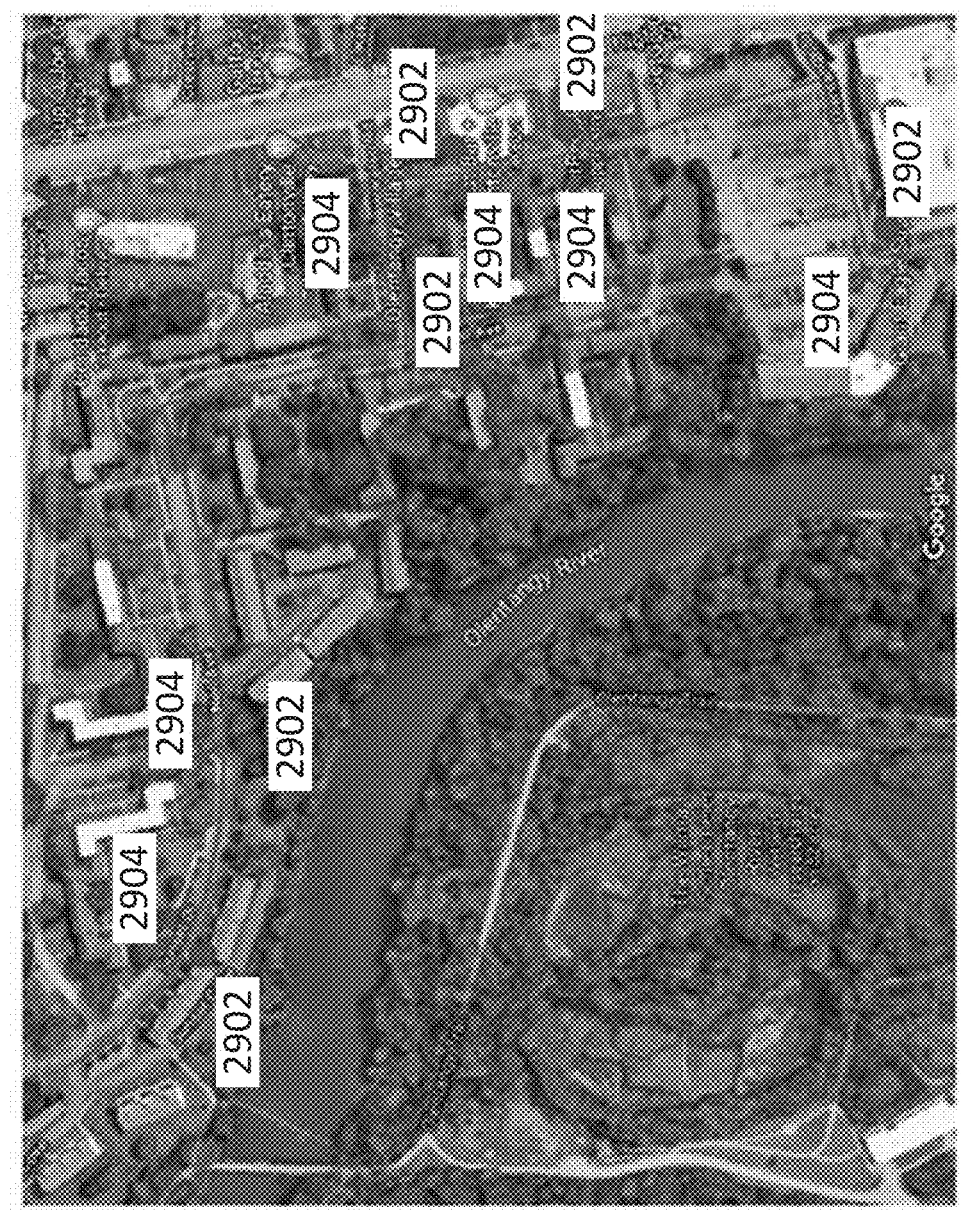
FIG. 29 illustrates an example urban driving path that was studied, including labels for both detected bumps and the ground truth bumps, according to an experimental implementation of the present disclosure.
Figure 30:
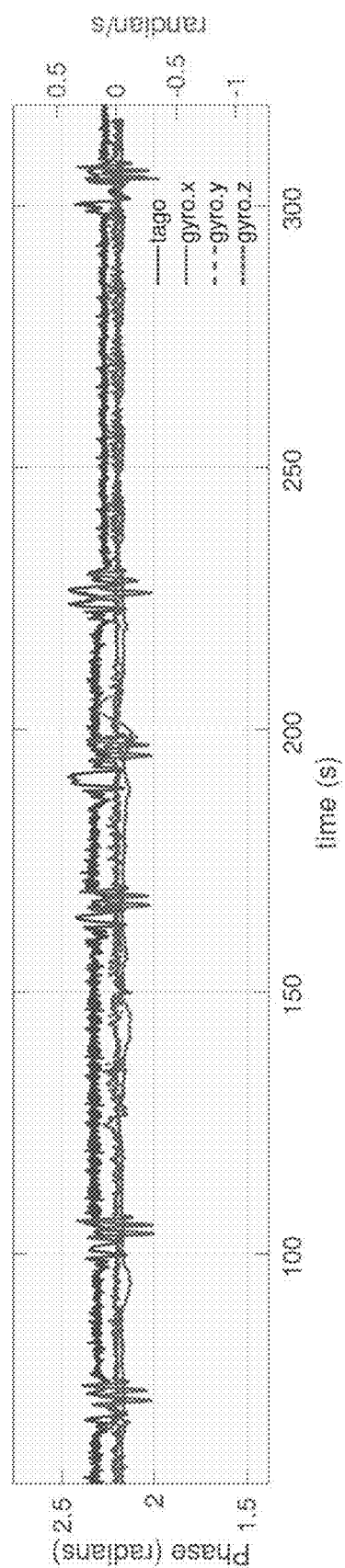
FIG. 30 illustrates phase readings from the tag and gyroscope data from the smartphone, when the study drove the vehicle in the urban area shown in FIG. 29.
Figure 31:
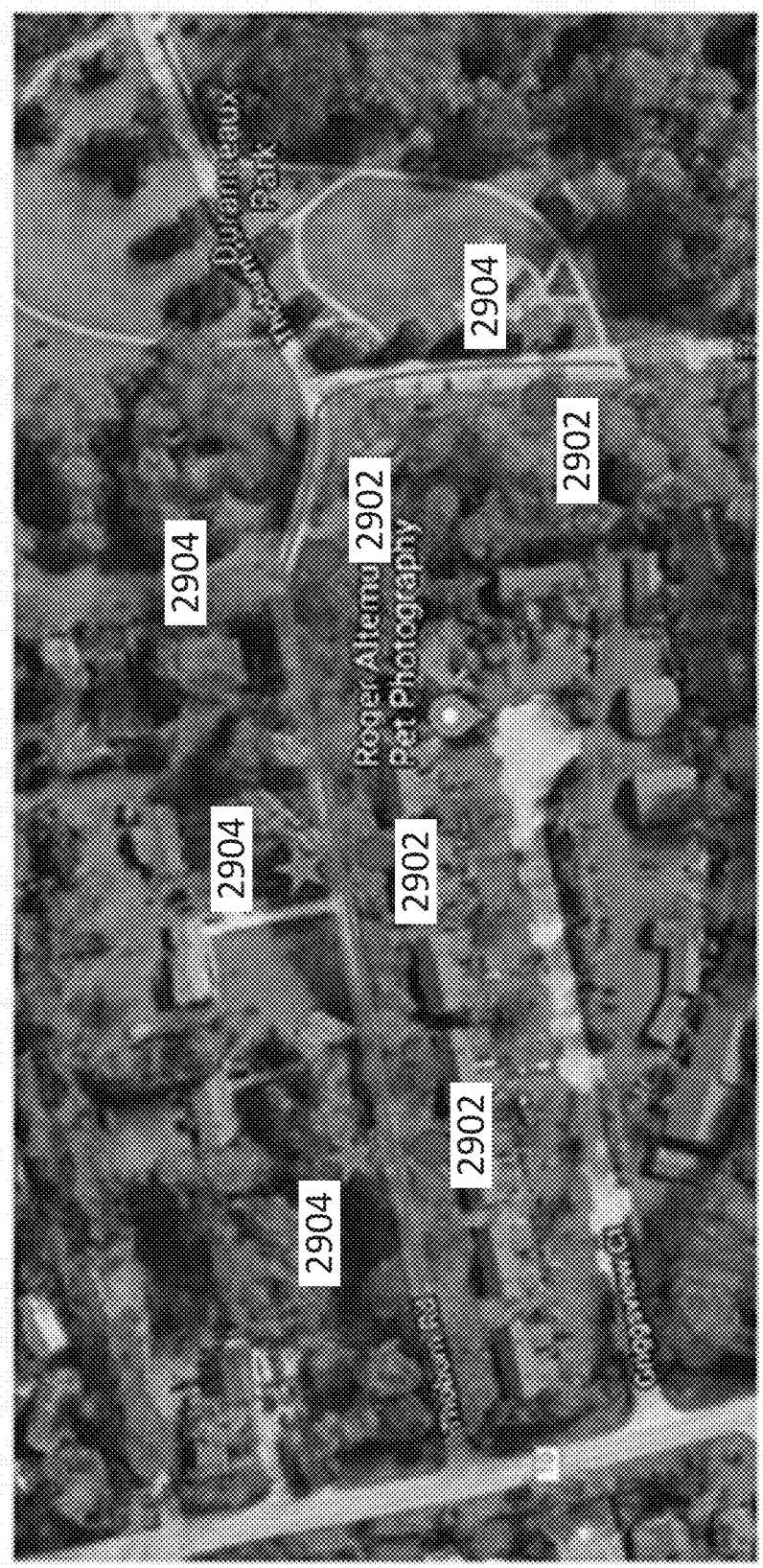
FIG. 31 illustrates an example residential driving path that was studied, including labels for both detected bumps and the ground truth bumps, according to an experimental implementation of the present disclosure.
Figure 32:
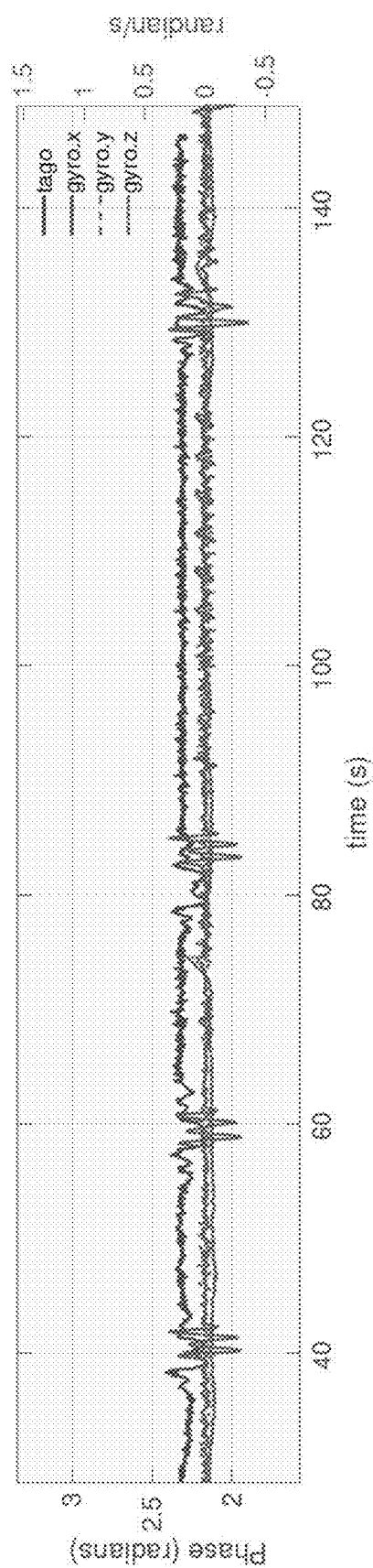
FIG. 32 illustrates phase readings from the tag and gyroscope data from the smartphone, when the study drove the vehicle in the residential area shown in FIG. 31.

FIG. 29 shows the detected bumps 2904 along the driving path at the urban area. FIG. 31 shows the detected bumps 2904 along the driving path at residential community. FIGS. 29 and 31 also indicate the ground-truth location 2902 of the bumps along the driving path. As shown, Tago can accurately detect the bumps on the road surface. FIG. 30 shows phase readings from the tag and gyroscope data from a smartphone when the vehicle drove the route in FIG. 29. FIG. 32 illustrates the phase readings from the tag and gyroscope data from the smartphone, when the vehicle drove the route illustrated in FIG. 31. The study drove the vehicle in the speed of around 15 mph. The road surface between two bumps is quite smooth in these two areas. Both of the phase readings and gyroscope data are quite stable, when the example vehicle drove on the smooth road. Tago can accurately detect the bumps on the road surface. And, Tago can sense the bumps on the road surface earlier than using the smartphone to sense the bumps, thereby the contact-free road surface sensing is achieved.

The example implementation can detect the road surface conditions. Specifically, the bumps or potholes on the road surface can be detected based on the backscattered signals reflected off the road surface. For fine-grained road surface sensing, the example implementation can differentiate the bumps and potholes on the road surface and sense the geometry of these bumps/potholes. These fine-grained road surface information can be used for road maintenance analysis, including by using various sensors (e.g., camera, Lidar and radar sensors). Implementations of the present disclosure can deploy multiple sensors on the vehicle to obtain the 3D geometry of bump/pothole.

The example implementation can use RFID tags to sense the fine-grained road surface information. To differentiate the pothole and bump on the road surface, example implementations can use one RFID tag deployed in the front of the vehicle and leverage the machine learning algorithm to do classification based on the backscattered signals reflected off the road surface. To characterize 3D geometry of bump or pothole on the road surface, some implementations of the present disclosure can deploy multiple tags at the front end of vehicle. Furthermore, using tag array will introduce extra processing latency, since commodity passive RFID system interrogates tag with slotted ALOHA protocol. The collision-free tag interrogation protocols (e.g., parallel decoding) can be used. But, these protocols have downsides (e.g., they can only work with tens of tags and require the hardware modification of tag or reader), which constrain them to be widely deployed.

RFID tags can include distributed beamforming using multiple readers [37]. To see how PushID can work for Tago, there are two design spaces example design spaces described herein. The applying PushID to Tago is deploying multiple readers on the vehicle, and these readers can collaborate with each other to do beamforming to activate the tag. However, this approach seems bulky due to the size of reader's directional antenna and the vehicle. Another implementation can deploy one reader and one tag for each vehicle. The tag can be activated by the readers deployed on the adjacent vehicles through opportunistic beamforming. As the proliferation of connected and automated vehicle (CAV) and edge computing, the readers at the different vehicles can optionally collaborate with each other through Internet backbone. However, this deployment has one downside. It can introduce collisions across the readers, which can require the readers deployed at different vehicles to collaborate with each other for collision resolving. Note that the limited communication range is not inherited from Tago's design. The example algorithms and designs described herein can be extended to the general low-power backscatter tag.

Due to the proliferation of connected and automated vehicle (CAV), the vehicles collaborate with each other and connect with the remote cloud. This CAV architecture can further enhance Tago's design and deployment. The road surface information collected by one vehicle using Tago can be shared with other vehicles through Internet backbone. The other vehicles can obtain the road surface information directly from a map database (e.g., google maps). Note the current satellite-based navigation system cannot show the road surface information to the drivers. The data processing and analysis can be moved to the cloud to relieve computation at the vehicle. One downside of this scheme is the communication latency at the Internet backbone, especially for highly mobile vehicles. Optionally, this can be overcome, as 5G becomes ubiquitous. Note that as more vehicles employ Tago for road surface sensing and the traffic becomes crowded on the road, the collisions across the reader from different vehicles may degrade the performance of road surface sensing. The example collision-free schemes for RFID communication described herein can solve this problem. Moreover, the directivity of Tago can mitigate the inter-reader interference.

In a passive RFID system, the tag can be battery-free, which can be activated by the external reader. So, the communication range is highly dependent on the reader's capability to illuminate the tag. So, the reader is usually instrumented with the directional antenna to concentrate the signals for powering up the tag. To fully power up the tag, the reader transmits the constant continuous wave. In the example implementation, since the tag is attached to the reader's antenna, the tag can always be activated. This means that the tag can always communicate with the reader. Tago relies on the backscattered signals reflected off the road surface to sense the bumps. The sensing range is highly depending on how far the transmitted RF signals from the reader can arrive and be received at the reader after being reflected off the road surface and modulated by the tag. Intuitively, the sensing range will be larger than the communication range, since the tag needs to be activated when the power of impinged RF signals is larger than a threshold consistently. However, in RFID-based sensing, the channel state information of backscattered signals are extracted from the EPC packets. In another words, the RF signals reflected off the road surface need to be modulated by the tag for preamble-based channel estimation to extract the desired channel for road surface sensing. Therefore, the tag needs to be activated and communicate with the reader, such that the example implementation can extract the phase or amplitude information to do sensing. In this regard, the sensing range is same as the communication range in RFID-based sensing. The present disclosure also includes micro-benchmark experiments showing the communication and sensing range of Tago.

Figure 33:
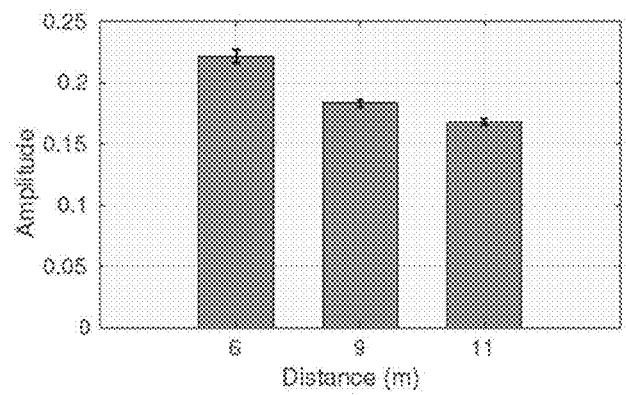
FIG. 33 illustrates examples of amplitudes of backscattered signals over different tag-reader distances, according to an experimental implementation of the present disclosure.

The study attached the reader's antennas at the front end of the vehicle. In this implementation, the tag was not attached to the reader's antenna like Tago's setup. The study measured the amplitude of the backscattered signals, when the study put tag 6, 9 and 11 meters away from the reader's antennas in front of the vehicle. FIG. 33 shows the amplitude of backscattered signals, when the tag is deployed 6, 9 and 11 meters away from the reader's antennas. The amplitude decreases as the tag-antenna distance increases. The reader can still read the tag, even though the tag is 11 meters away from the reader. This indicates that the RFID system's communication range can be more than 10 meters. This indicates that the sensing range of Tago could be larger than 10 meters.

Figure 34:
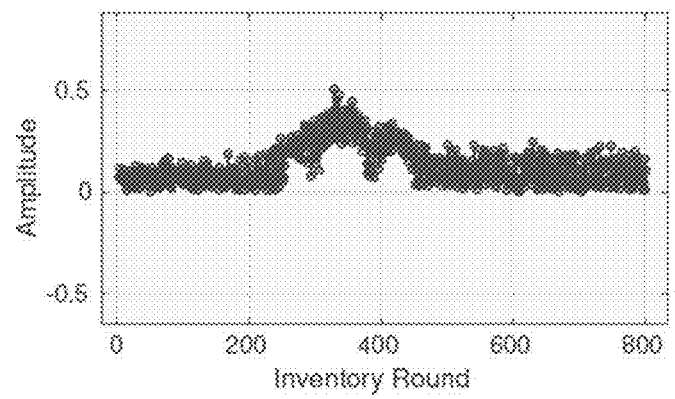
FIG. 34 illustrates amplitude readings of backscattered signals, when people performed a gesture 10 meters away from an example implementation, according to an experimental implementation of the present disclosure.
Figure 35:
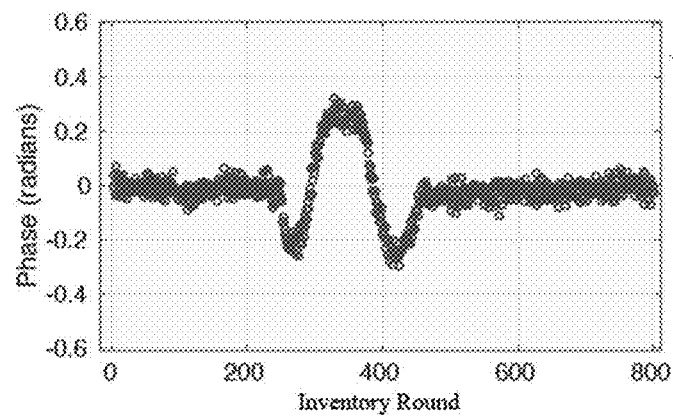
FIG. 35 illustrates phase readings of backscattered signals, when people performed a gesture 10 meters away from an example implementation, according to an experimental implementation of the present disclosure.

The reader can capture variation 10 meters away from the Tago antenna. A case study shows 10m sensing range of Tago through a case study. The study evaluated sensing range in Tago's setup. The study attached the reader's antennas at the front end of the vehicle, and the tag is attached on the reader's antenna. Then, the study asked alone person 10 meters away from Tago's setup to perform a gesture in front of the vehicle. Tago will process the backscattered signals. FIG. 34 shows the amplitude readings over time, and FIG. 35 shows the phase readings over time, when people perform the gesture 10 meters away from Tago. The results show that Tago has the sensing range of 10 meters.

Tago can sense the road surface conditions with commodity passive RFID system. Instead of deploying the reader or tags on the existing infrastructure (e.g., lamp post and roadways), the reader can be deployed inside of the vehicle and the tag can be attached at the front end of the vehicle to achieve contact-free sensing. The extensive experiments show the efficiency of Tago on road surface sensing in comparison to the state-of-the-art smartphone-based road surface sensing.

REFERENCES

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

[1] Automatic road analyzer. https://www.wtae.com/article/aran-on-the-prowl-automatic-road-analyzer-gathers-information-to-mapfuture-state-road-repairs-1/7462861.
[2] Understanding the Link Between Unsafe Road Conditions and Car Accidents. https://www.makeroadssafe.org/understanding-the-linkbetween-unsafe-road-conditions-and-car-accidents/
[3] Omid Abari, Deepak Vasisht, Dina Katabi, and Anantha Chandrakasan. 2015. Caraoke: An e-toll transponder network for smart cities. In Proceedings of the 2015 ACM Conference on Special Interest Group on Data Communication. 297-310.
[4] Alien. 2020. ALR-8697-8. https://www.alientechnology.com/products/antennas/alr-8697-8/.
[5] Zhenlin An, Qiongzheng Lin, and Lei Yang. 2018. Cross-frequency communication: Near-field identification of uhf rfids with wifi!. In Proceedings of the 24th Annual International Conference on Mobile Computing and Networking. 623-638.
[6] atlasRFIDstore. 2020. Commodity passive RFID tags. https://www.atlasrfidstore.com/rfid-tag-sample-pack-uhf-passive/.
[7] atlasRFIDstore. 2020. Commodity Passive RFID tags. https://www.atlasrfidstore.com/rfid-tags/.
[8] Joshua F Ensworth and Matthew S Reynolds. 2015. Every smart phone is a backscatter reader: Modulated backscatter compatibility with bluetooth 4.0 low energy (ble) devices. In 2015 IEEE international conference on RFID (RFID). IEEE, 78-85.
[9] Jakob Eriksson, Lewis Girod, Bret Hull, Ryan Newton, Samuel Madden, and Hari Balakrishnan. 2008. The pothole patrol: using a mobile sensor network for road surface monitoring. In Proceedings of the 6th international conference on Mobile systems, applications, and services 29-39.
[10] Junfeng Guan, Sohrab Madani, Suraj Jog, Saurabh Gupta, and Haitham Hassanieh. 2020. Through Fog High-Resolution Imaging Using Millimeter Wave Radar. In Proceedings of the IEEE/CVF Conference on Computer Vision and Pattern Recognition. 11464-11473.
[11] Abhishek Gupta, Shaohan Hu, Weida Zhong, Adel Sadek, Lu Su, and Chunming Qiao. 2020. Road Grade Estimation Using Crowd-Sourced Smartphone Data. In 2020 19th ACM/IEEE International Conference on Information Processing in Sensor Networks (IPSN). IEEE, 313-324.
[12] Unsoo Ha, Junshan Leng, Alaa Khaddaj, and Fadel Adib. 2020. Food and Liquid Sensing in Practical Environments using RFIDs. In 17th {USENIX} Symposium on Networked Systems Design and Implementation ({NSDI} 20). 1083-1100.
[13] Jens Jauch, Johannes Masino, Tim Staiger, and Frank Gauterin. 2017. Road grade estimation with vehicle-based inertial measurement unit and orientation filter. IEEE Sensors fournal 18, 2 (2017), 781-789.
[14] Haojian Jin, Zhijian Yang, Swarun Kumar, and Jason I Hong. 2018. Towards wearable everyday body-frame tracking using passive rfids. Proceedings of the ACM on Interactive, Mobile, Wearable and Ubiquitous Technologies 1, 4 (2018), 1-23.
[15] Nikos Kargas, Fanis Mavromatis, and Aggelos Bletsas. 2015. Fully-coherent reader with commodity SDR for Gen2 FM0 and computational RFID. IEEE Wireless Communications Letters 4, 6 (2015), 617-620. Keiko Katsuragawa, Ju Wang, Ziyang Shan, Ningshan Ouyang, Omid Abari, and Daniel Vogel. 2019. Tip-Tap: Battery-free Discrete 2D Fingertip Input. In Proceedings of the 32nd Annual ACM Symposium on User Interface Software and Technology. 1045-1057.
[17] Rushil Khurana and Mayank Goel. 2020. Eyes on the Road: Detecting Phone Usage by Drivers Using On-Device Cameras. In Proceedings of the 2020 CHI Conference on Human Factors in Computing Systems. 1-11.
[18] Martin Laurenzis, Frank Christnacher, Emmanuel Bacher, Nicolas Metzger, Stéphane Schertzer, and Thomas Scholz. 2011. New approaches of three-dimensional range-gated imaging in scattering environments. In Electro-Optical Remote Sensing, Photonic Technologies, and Applications V, Vol. 8186. International Society for Optics and Photonics, 818603.
[19] Jaeyoung Lee, BooHyun Nam, and Mohamed Abdel-Aty. 2015. Effects of pavement surface conditions on traffic crash severity. Journal of Transportation Engineering 141, 10 (2015), 04015020.
[20] Yunfei Ma, Nicholas Selby, and Fadel Adib. 2017. Minding the billions: Ultra-wideband localization for deployed rfid tags. In Proceedings of the 23 rd Annual International Conference on Mobile Computing and Networking. 248-260.
[21] Prashanth Mohan, Venkata N Padmanabhan, and Ramachandran Ramjee. 2008. Nericell: rich monitoring of road and traffic conditions using mobile smartphones. In Proceedings of the 6th ACM conference on Embedded network sensor systems. 323-336.
[21] Kun Qian, Shilin Zhu, Xinyu Zhang, and Li Erran Li. 2021. Robust Multimodal Vehicle Detection in Foggy Weather Using Complementary Lidar and Radar Signals. In Proceedings of the IEEE/CVF Conference on Computer Vision and Pattern Recognition. 444-453.
[23] Ettus Research. 2020. USRP N210. https://www.ettus.com/product/details/UN210-KIT/.
[24] Guy Satat, Matthew Tancik, and Ramesh Raskar. 2018. Towards photography through realistic fog. In 2018 IEEE International Conference on Computational Photography (ICCP). IEEE, 1-10.
[25] Fatjon Seraj, Berend Jan van der Zwaag, Arta Dilo, Tamara Luarasi, and Paul Havinga. 2015. RoADS: A road pavement monitoring system for anomaly detection using smart phones. In Big data analytics in the social and ubiquitous context. Springer, 128-146.
[26] Henry M Stommel, Dennis W Moore, and Dennis W Moore. 1989. An introduction to the Coriolis force. Columbia University Press.
[27] sun2020allergie Wei Sun and Kannan Srinivasan. [n. d.]. Allergie: Relative Vehicular Localization with Commodity RFID System. In 2020 IEEE International Conference on RFID (RFID). IEEE, 1-8
[28] Tesla. 2020. Autonomous vehicle. https://www.tesla.com/.

[29] Saurabh Tiwari, Ravi Bhandari, and Bhaskaran Raman. 2020. Roadcare: a deep-learning based approach to quantifying road surface quality. In Proceedings of the 3rd ACM SIGCAS Conference on Computing and Sustainable Societies. 231-242.

[30] Jue Wang, Fadel Adib, Ross Knepper, Dina Katabi, and Daniela Rus. 2013. RF-compass: Robot object manipulation using RFIDs. In Proceedings of the 19th annual international conference on Mobile computing & networking. 3-14.

[31] Ju Wang, Liqiong Chang, Shourya Aggarwal, Omid Abari, and Srinivasan Keshav. 2020. Soil moisture sensing with commodity RFID systems. In Proceedings of the 18th International Conference on Mobile Systems, Applications, and Services. 273-285.

[32] Jue Wang and Dina Katabi. 2013. Dude, where's my card? RFID positioning that works with multipath and non-line of sight. In Proceedings of the ACM SIGCOMM 2013 conference on SIGCOMM. 51-62.

[33] Ju Wang, Jianyan Li, Mohammad Hossein Mazaheri, Keiko Katsuragawa, Daniel Vogel, and Omid Abari. 2020. Sensing finger input using an RFID transmission line. In Proceedings of the 18th Conference on Embedded Networked Sensor Systems. 531-543.

[34] Jingxian Wang, Chengfeng Pan, Haojian Jin, Vaibhav Singh, Yash Jain, Jason I Hong, Carmel Majidi, and Swarun Kumar. 2019. RFID Tattoo: A Wireless Platform for Speech Recognition. Proceedings of the ACM on Interactive, Mobile, Wearable and Ubiquitous Technologies 3,4(2019), 1-24

[35] Jue Wang, Deepak Vasisht, and Dina Katabi. 2014. RF-IDraw: virtual touch screen in the air using RF signals. ACM SIGCOMM Computer Communication Review 44, 4 (2014), 235-246.

[36] Ju Wang, Jie Xiong, Xiaojiang Chen, Hongbo Jiang, Rajesh Krishna Balan, and Dingyi Fang. 2017. TagScan: Simultaneous target imaging and material identification with commodity RFID devices. In Proceedings of the 23rd Annual International Conference on Mobile Computing and Networking. 288-300

[37] Jingxian Wang, Junbo Zhang, Rajarshi Saha, Haojian Jin, and Swarun Kumar. 2019. Pushing the range limits of commercial passive RFIDs. In 16th {USENIX} Symposium on Networked Systems Design and Implementation ({NSDI} 19). 301-316.

[38] Yinsong Wang, Yajie Zou, Kristian Henrickson, Yinhai Wang, Jinjun Tang, and Byung-Jung Park. 2017. Google Earth elevation data extraction and accuracy assessment for transportation applications. PloS one 12, 4 (2017), e0175756.

[39] waymo. 2020. Autonomous vehicle. https://waymo.com/.

[40] Teng Wei and Xinyu Zhang. 2016. Gyro in the air: tracking 3D orientation of batteryless internet-of-things. In Proceedings of the 22nd Annual International Conference on Mobile Computing and Networking. 55-68.

[41] Binbin Xie, Jie Xiong, Xiaojiang Chen, and Dingyi Fang. 2020. Exploring commodity RFID for contactless sub-millimeter vibration sensing. In Proceedings of the 18th Conference on Embedded Networked Sensor Systems. 15-27.

[42] Lei Yang, Yekui Chen, Xiang-Yang Li, Chaowei Xiao, Mo Li, and Yunhao Liu. 2014. Tagoram: Real-time tracking of mobile RFID tags to high precision using COTS devices. In Proceedings of the 20th annual international conference on Mobile computing and networking. 237-248.

[43] Lei Yang, Qiongzheng Lin, Xiangyang Li, Tianci Liu, and Yunhao Liu. 2015. See through walls with COTS RFID system!. In Proceedings of the 21st Annual International Conference on Mobile Computing and Networking. 487-499.

[44] Panlong Yang, Yuanhao Feng, Jie Xiong, Ziyang Chen, and Xiang-Yang Li. 2020. RF-Ear: Contactless Multi-device Vibration Sensing and Identification Using COTS RFID. In IEEE INFOCOM 2020-IEEE Conference on Computer Communications. IEEE, 297-306.

[45] Xiaobin Zhang, Liangfei Xu, Jianqiu Li, and Minggao Ouyang. 2013. Real-time estimation of vehicle mass and road grade based on multi-sensor data fusion. In 2013 IEEE Vehicle Power and Propulsion Conference (VPPC). IEEE, 1-7.

[46] Weida Zhong, Qiuling Suo, Fenglong Ma, Yunfei Hou, Abhishek Gupta, Chunming Qiao, and Lu Su. 2019. A Reliability-Aware Vehicular Crowdsensing System for Pothole Profiling. Proceedings of the ACM on Interactive, Mobile, Wearable and Ubiquitous Technologies 3, 4 (2019), 1-26.

What is claimed:

1. A method for remote sensing of a road surface comprising:
transmitting, by a transmitting antenna, a radiofrequency signal toward a road surface;
receiving, by a first radiofrequency identification (RFID) tag, a first backscattered radiofrequency signal from the road surface;
receiving, by a receiving antenna, an RFID signal from the first RFID tag, the RFID signal comprising phase and magnitude information;
wherein the method further comprises receiving, using a second RFID tag, a second backscattered radiofrequency signal;
analyzing, by an RFID reader, the phase and magnitude information to determine a condition of the road surface, wherein the condition of the road surface comprises a three-dimensional shape of the road surface; and
determining the three-dimensional shape of the road surface using the RFID tag and the second RFID tag.

2. The method of claim 1, wherein the step of analyzing, by the RFID reader, the phase and magnitude information to determine the condition of the road surface further comprises obtaining a road information by performing signal cancelation on the magnitude and phase information; wherein the signal cancelation removes a multipath effect from the phase and magnitude information; and wherein the road information represents a magnitude and phase of a signal reflected by the road surface.

3. The method of claim 2, wherein performing signal cancelation further comprises removing a line-of-sight propagation channel between the RFID reader and the first RFID tag.

4. The method of claim 1, wherein the step of analyzing, by the RFID reader, the phase and magnitude information to determine the condition of the road surface further comprises determining, using the condition of the road surface, a shape of the road surface.

5. The method of claim 1, wherein the condition of the road surface comprises a location of one or more bumps, potholes, or irregularities in the road surface.

6. The method of claim 1, wherein the condition of the road surface comprises a depth of one or more potholes in the road surface.

7. The method of claim 1, wherein the RFID tag and the second RFID tag are spaced on opposite sides of a vehicle.

8. The method of claim 1, wherein the phase information comprises a phase offset.

9. A system for remote sensing of a road surface comprising:
- an antenna configured to transmit and receive radiofrequency (RF) signals, wherein the antenna is configured to attach to a front end of a vehicle;
- a plurality of radiofrequency identification (RFID) tags comprising a first RFID tag configured to attach to the front end of the vehicle and a second RFID tag; and
- an RFID reader, wherein the RFID reader is configured to:
- cause the antenna to transmit an RF signal toward a road surface, wherein first RFID tag receives a backscattered RF signal from the road surface and the second RFID Tag receives a second backscattered radiofrequency signal from the road surface;
- receive, from the antenna, an RFID signal from the first RFID tag and the second RFID tag, the RFID signal comprising phase and magnitude information; and
- analyze the phase and magnitude information to determine a condition of the road surface wherein the condition of the road surface comprises a three-dimensional shape of the road surface;
- determine the three-dimensional shape of the road surface using the first RFID tag and the second RFID tag.

10. The system of claim 9, wherein the RFID reader is further configured to analyze the phase and magnitude information to determine the condition of the road surface by obtaining a road information by performing signal cancelation on the magnitude and phase information; wherein the signal cancelation removes a multipath effect from the phase and magnitude information; and wherein the road information represents a magnitude and phase of a signal reflected by the road surface.

11. The system of claim 10, wherein performing signal cancelation further comprises removing a line-of-sight propagation channel between the RFID reader and at least one RFID tag of the plurality of RFID tags.

12. The system of claim 9, wherein the RFID reader is further configured to determine, using the condition of the road surface, a shape of the road surface.

13. The system of claim 9, wherein the condition of the road surface comprises a location of one or more bumps, potholes, or irregularities in the road surface.

14. The system of claim 9, wherein the condition of the road surface comprises a depth of one or more potholes in the road surface.

15. The system of claim 1, wherein the first RFID tag and the second RFID tag are spaced on opposite sides of the vehicle.

16. The system of claim 9, wherein the phase information comprises a phase offset.

* * * * *